US011906394B2

(12) United States Patent
Dankers et al.

(10) Patent No.: US 11,906,394 B2
(45) Date of Patent: Feb. 20, 2024

(54) SYSTEM AND METHOD FOR LOCATING AN AREA OF INTEREST IN A CONDUIT

(71) Applicant: Hifi Engineering Inc., Calgary (CA)

(72) Inventors: Arne Dankers, Calgary (CA); Seyed Ehsan Jalilian, Calgary (CA)

(73) Assignee: HIFI ENGINEERING INC., Calgary (CA)

( * ) Notice: Subject to any disclaimer, the term of this patent is extended or adjusted under 35 U.S.C. 154(b) by 532 days.

(21) Appl. No.: 17/046,539

(22) PCT Filed: Apr. 4, 2019

(86) PCT No.: PCT/CA2019/050415
§ 371 (c)(1),
(2) Date: Oct. 9, 2020

(87) PCT Pub. No.: WO2019/195923
PCT Pub. Date: Oct. 17, 2019

(65) Prior Publication Data
US 2021/0033485 A1 Feb. 4, 2021

Related U.S. Application Data

(60) Provisional application No. 62/656,800, filed on Apr. 12, 2018.

(51) Int. Cl.
*G01M 3/24* (2006.01)
*E21B 47/107* (2012.01)
*E21B 47/117* (2012.01)
*G01D 5/353* (2006.01)

(52) U.S. Cl.
CPC .......... *G01M 3/243* (2013.01); *E21B 47/107* (2020.05); *E21B 47/117* (2020.05); *G01D 5/353* (2013.01)

(58) Field of Classification Search
CPC .... G01M 3/243; E21B 47/107; E21B 47/117; G01D 5/353
USPC .............................................................. 702/6
See application file for complete search history.

(56) References Cited

U.S. PATENT DOCUMENTS

| 5,416,724 A | 5/1995 | Savic |
| 10,598,563 B2 * | 3/2020 | Lu ......................... G01N 29/223 |
| 2013/0092371 A1 * | 4/2013 | Hartog .................... E21B 47/06 |
| | | 166/250.01 |

(Continued)

FOREIGN PATENT DOCUMENTS

| WO | 2013102252 A1 | 7/2013 | |
| WO | WO-2016183677 A1 * | 11/2016 | ............ G01B 11/161 |
| WO | WO-2017031578 A1 * | 3/2017 | ............. E21B 47/04 |

*Primary Examiner* — John E Breene
*Assistant Examiner* — Dacthang P Ngo
(74) *Attorney, Agent, or Firm* — D'Ambrosio & Menon, PLLC; Usha Menon

(57) ABSTRACT

There is described a method of locating an area of interest in a conduit, comprising: measuring multiple acoustic signals at multiple locations along the conduit; for each acoustic signal, determining its autocorrelation; and applying a relationship to the determined autocorrelations to estimate a location of the area of interest, wherein the relationship is between autocorrelations of acoustic signals measured in a modelled conduit and modelled areas of interest in the modelled conduit, wherein it is assumed that acoustic signals propagating along the modelled conduit reflect from at least one point in the modelled conduit.

17 Claims, 16 Drawing Sheets

(56) References Cited

U.S. PATENT DOCUMENTS

2015/0034306 A1 2/2015 Hull
2017/0153155 A1 6/2017 Hull
2019/0128766 A1* 5/2019 Burtea .................... G06F 17/40

* cited by examiner

SYSTEM AND METHOD FOR LOCATING AN AREA OF INTEREST IN A CONDUIT

FIELD OF THE DISCLOSURE

The present disclosures relates to systems and methods for locating an area of interest, such as a leak, in a conduit.

BACKGROUND TO THE DISCLOSURE

Pipelines as well as oil and gas wells are examples of conduits that are used to transport liquids or gases (collectively, "fluids") which, if leaked, could cause environmental damage. In the example of pipelines, the fluid may comprise oil. In the example of an oil well, the fluid may comprise liquid production fluid or may be gaseous, such as when casing vent flow or gas migration occurs. Accordingly, in certain circumstances it may be desirable to monitor fluid conduits to determine whether a leak or other event potentially relevant to the integrity of the conduit has occurred.

The present disclosure seeks to provide an improved system and method for locating an area of interest, such as a leak, in a conduit.

SUMMARY OF THE DISCLOSURE

In a first aspect of the disclosure, there is provided a system for locating an area of interest in a conduit. The system comprises a conduit; one or more optical fiber sensors positioned alongside the conduit; and an optical interrogator configured to: transmit one or more light pulses along the one or more optical fiber sensors; receive reflections of the one or more light pulses; and determine from the reflections one or more interference signals. The system further comprises one or more processors communicative with the optical interrogator and with a computer-readable medium having stored thereon computer program code configured when executed by one or more processors to cause the one or more processors to perform a method. The method comprises: processing the one or more interference signals to obtain multiple acoustic recordings as a function of position along the conduit; for each acoustic recording, determining its autocorrelation; and applying a relationship to the determined autocorrelations to estimate a location of the area of interest, wherein the relationship is between autocorrelations of acoustic recordings measured in a modelled conduit and modelled areas of interest in the modelled conduit, wherein it is assumed that acoustic signals propagating along the modelled conduit reflect from at least one point in the modelled conduit. Furthermore, it may be assumed that the modelled conduit is terminated at one end, or at multiple ends thereof.

The method may further comprise determining the relationship. Determining the relationship may comprise modelling propagations and reflections of acoustic signals along the modelled conduit. The area of interest may comprise an acoustic source. The acoustic source may comprise a leak in the conduit.

The area of interest may comprise a reflective interface in the conduit. The reflective interface comprise a change in an interior surface of the conduit or a change in a fluid in the conduit.

The conduit may comprise a pipeline or a wellbore.

The modelled conduit may comprise modelled acoustic channels each corresponding to a portion of the modelled conduit, each modelled acoustic channel being modelled as a filter affecting propagation of acoustic signals along the acoustic channel. Each filter may comprise a transfer function of the form $G(q)=aq^{-t}$, wherein G is the transfer function, q is a delay operator of the form $q^{-1}s(t)=s(t-1)$, s is a dummy variable, a is a constant indicative of attenuation along the acoustic channel, and t is a constant indicative of an amount of time taken by an acoustic signal to travel along the acoustic channel.

Determining the autocorrelations may comprise determining $R_w(\tau, d_r)=E[w_m(t,d_r)w_m(t-\tau,d_r)]$, wherein R is the autocorrelation of the acoustic recording, r is a time lag of the autocorrelation, $d_r$ is a position along the conduit at which the acoustic recording is obtained, E is an expected value operator, t is time, and w is the acoustic recording.

Estimating the location of the area of interest may comprise using the determined autocorrelations to determine a distance to the area of interest as a function of time lag of the autocorrelations. Estimating the location of the area of interest may comprise generating a plot of the distance to the area of interest as a function of the time lag of the autocorrelations.

The area of interest may comprise an acoustic source, and estimating the location of the area of interest may comprise determining $$d_s = \frac{yv_2}{v_1},$$

wherein $d_s$ is a distance to the location of the area of interest, y is a y-intercept corresponding to one or more lines of the plot, and $v_1$ and $v_2$ are time lags corresponding to one or more lines of the plot.

The area of interest may comprise an acoustic source, and estimating the location of the area of interest may comprise determining $$d_s = \frac{1}{2}(d_l - y) + \frac{d_l}{2}\frac{v_2}{v_1 + v_2},$$

wherein $d_s$ is a distance to the location of the area of interest, y is a y-intercept corresponding to one or more lines of the plot, $v_1$ and $v_2$ are time lags corresponding to one or more lines of the plot, and $d_l$ is a length of the conduit.

The area of interest may comprise a reflective interface in the conduit, and estimating the location of the area of interest may comprise determining a y-intercept corresponding to one or more lines of the plot.

The area of interest may comprise a reflective interface in the conduit, and estimating the location of the area of interest may comprise determining $$d_i = \frac{1}{2}y + \frac{1}{2}\frac{v_1 d_l}{v_1 + v_2},$$

wherein $d_s$ is a distance to the location of the area of interest, y is a y-intercept corresponding to one or more lines of the plot, $v_1$ and $v_2$ are time lags corresponding to one or more lines of the plot, and $d_l$ is a length of the conduit.

The multiple acoustic recordings may be obtained in respect of different periods of time.

In a further aspect of the disclosure, there is provided a method of locating an area of interest in a conduit. The method comprises: measuring multiple acoustic signals at multiple locations along the conduit; for each acoustic signal, determining its autocorrelation; and applying a relationship to the determined autocorrelations to estimate a location of the area of interest, wherein the relationship is between autocorrelations of acoustic signals measured in a modelled conduit and modelled areas of interest in the modelled conduit, wherein it is assumed that acoustic signals propagating along the modelled conduit reflect from at least one point in the modelled conduit. Furthermore, it may be assumed that the modelled conduit is terminated at one end, or at multiple ends thereof.

Any of the features described in connection with the first aspect of the disclosure may be combined with the above-described further aspect of the disclosure.

In a further aspect of the disclosure, there is provided a computer-readable medium having stored thereon computer program code configured when executed by one or more processors to cause the one or more processors to perform a method of locating an area of interest in a conduit. The method comprises: obtaining multiple acoustic recordings, each acoustic recording corresponding to an acoustic signal measured at a location along the conduit; for each modelled acoustic recording, determining its autocorrelation; and applying a relationship to the determined autocorrelations to estimate a location of the area of interest, wherein the relationship is between autocorrelations of acoustic recordings measured in a modelled conduit and modelled areas of interest in the modelled conduit, wherein it is assumed that acoustic signals propagating along the modelled conduit reflect from at least one point in the modelled conduit. Furthermore, it may be assumed that the modelled conduit is terminated at one end, or at multiple ends thereof.

Any of the features described in connection with the above-described further aspect of the disclosure may be combined with the above-described computer-readable medium.

In a further aspect of the disclosure, there is provided a system for locating an area of interest in a conduit. The system comprises: a conduit; one or more acoustic sensors configured to obtain multiple acoustic recordings as a function of position along the conduit; and one or more processors communicative with the optical interrogator and with a computer-readable medium having stored thereon computer program code configured when executed by one or more processors to cause the one or more processors to perform a method. The method comprises: using a modelled acoustic response of the conduit to model each acoustic recording, wherein the modelled acoustic response assumes the conduit is terminated at ends thereof; for each modelled acoustic recording, determining its autocorrelation; and applying a relationship to the determined autocorrelations to estimate a location of the area of interest, wherein the relationship is between autocorrelations of acoustic recordings measured in a modelled conduit and modelled areas of interest in the modelled conduit, wherein it is assumed that acoustic signals propagating along the modelled conduit reflect from at least one point in the modelled conduit. Furthermore, it may be assumed that the modelled conduit is terminated at one end, or at multiple ends thereof.

Any of the features described in connection with the above-described computer-readable medium may be combined with the immediately above-described system.

BRIEF DESCRIPTION OF THE DRAWINGS

Specific embodiments will now be described in conjunction with the accompanying drawings of which.

DETAILED DESCRIPTION OF EMBODIMENTS

The present disclosure seeks to provide systems and methods for locating an area of interest in a conduit. While various embodiments of the disclosure are described below, the disclosure is not limited to these embodiments, and variations of these embodiments may well fall within the scope of the disclosure which is to be limited only by the appended claims.

As used herein, "acoustics" refer generally to any type of "dynamic strain" (strain that changes over time). Acoustics having a frequency between about 20 Hz and about 20 kHz are generally perceptible by humans. Acoustics having a frequency of between about 5 Hz and about 20 Hz are referred to by persons skilled in the art as "vibration", and acoustics that change at a rate of <1 Hz, such as at 500 µHz, are referred to as "sub-Hz strain"; as used herein, a reference to "about" or "approximately" a number or to being "substantially" equal to a number means being within +1-10% of that number.

Figure 1A:
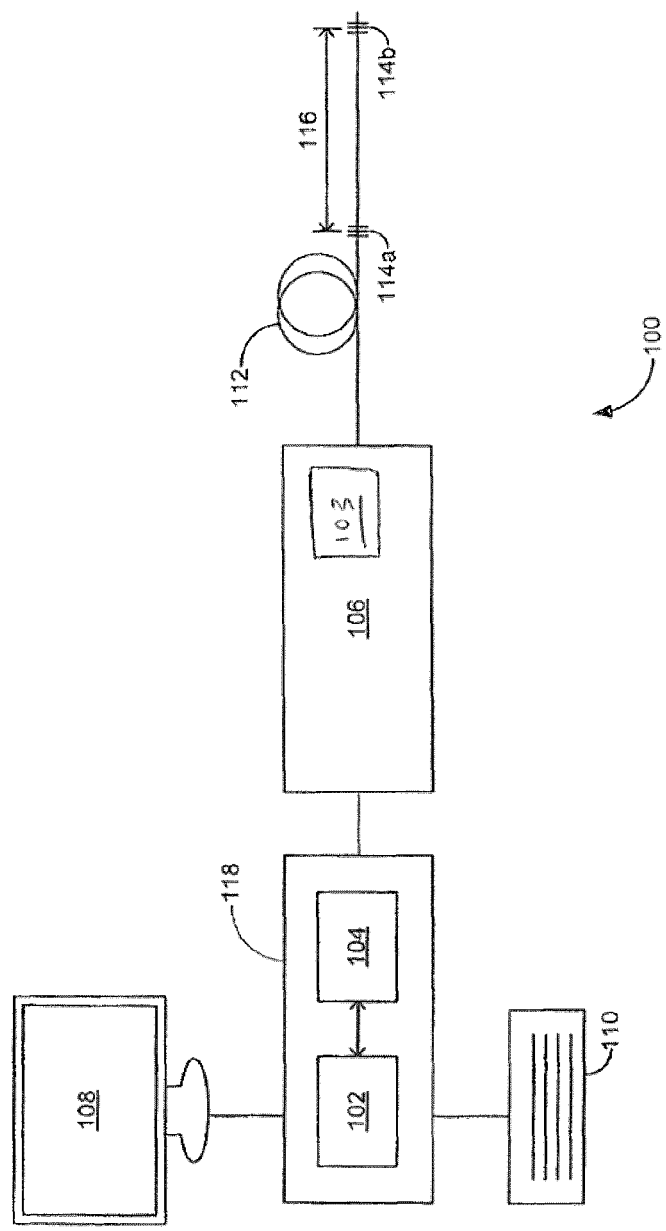
FIG. 1A is a block diagram of a system for determining whether an event has occurred from dynamic strain measurements, which includes an optical fiber with fiber Bragg gratings ("FBGs") for reflecting a light pulse, in accordance with an embodiment of the disclosure.

The embodiments described herein are directed at methods, systems, and techniques for locating an area of interest within a fluid conduit such as a pipeline. Optical interferometry using fiber Bragg gratings ("FBGs"), as described in further detail with respect to FIGS. 1A 1C, is used to measure acoustics. In some of the embodiments described herein, a processor determines a measured acoustic signal using optical interferometry, and from that measured acoustic signal determines or estimates the location of an area of interest (such as a leak or a reflective interface) in the conduit.

Referring now to FIG. 1A, there is shown one embodiment of a system 100 for performing interferometry using fiber Bragg gratings ("FBGs"). The system 100 comprises optical fiber 112, an interrogator 106 optically coupled to the optical fiber 112, and a signal processing device 118 that is communicative with the interrogator 106.

The optical fiber 112 comprises one or more fiber optic strands, each of which is made from quartz glass (amorphous $SiO2$). The fiber optic strands are doped with various elements and compounds (including germanium, erbium oxides, and others) to alter their refractive indices, although in alternative embodiments the fiber optic strands may not be doped. Single mode and multimode optical strands of fiber are commercially available from, for example, Corning® Optical Fiber. Example optical fibers include ClearCurve™ fibers (bend insensitive), SMF28 series single mode fibers such as SMF-28 ULL fibers or SMF-28e fibers, and InfmiCor® series multimode fibers.

The interrogator 106 generates the sensing and reference pulses and outputs the reference pulse after the sensing pulse. The pulses are transmitted along optical fiber 112 that comprises a first pair of FBGs. The first pair of FBGs comprises first and second FBGs 114a,b (generally, "FBGs 114"). The first and second FBGs 114a,b are separated by a certain segment 116 of the optical fiber 112 ("fiber segment 116"). The optical length of the fiber segment 116 varies in response to dynamic strain that the fiber segment 116 experiences.

The light pulses have a wavelength identical or very close to the center wavelength of the FBGs 114, which is the wavelength of light the FBGs 114 are designed to partially reflect; for example, typical FBGs 114 are tuned to reflect light in the 1,000 to 2,000 nm wavelength range. The sensing and reference pulses are accordingly each partially reflected by the FBGs 114a,b and return to the interrogator 106. The delay between transmission of the sensing and reference pulses is such that the reference pulse that reflects off the first FBG 114a (hereinafter the "reflected reference pulse") arrives at the optical receiver 103 simultaneously with the sensing pulse that reflects off the second FBG 114b (hereinafter the "reflected sensing pulse"), which permits optical interference to occur.

While FIG. 1A shows only the one pair of FBGs 114a,b, in alternative embodiments (not depicted) any number of FBGs 114 may be on the fiber 112, and time division multiplexing (TDM) (and, optionally, wavelength division multiplexing (WDM)) may be used to simultaneously obtain measurements from them. If two or more pairs of FBGs 114 are used, any one of the pairs may be tuned to reflect a different center wavelength than any other of the pairs. Alternatively, a group of multiple FBGs 114 may be tuned to reflect a different center wavelength to another group of multiple FBGs 114, and there may be any number of groups of multiple FBGs extending along the optical fiber 112 with each group of FBGs 114 tuned to reflect a different center wavelength. In these example embodiments where different pairs or group of FBGs 114 are tuned to reflect different center wavelengths to other pairs or groups of FBGs 114, WDM may be used in order to transmit and to receive light from the different pairs or groups of FBGs 114, effectively extending the number of FBG pairs or groups that can be used in series along the optical fiber 112 by reducing the effect of optical loss that otherwise would have resulted from light reflecting from the FBGs 114 located on the fiber 112 nearer to the interrogator 106. When different pairs of the FBGs 114 are not tuned to different center wavelengths, TDM is sufficient.

The interrogator 106 emits laser light with a wavelength selected to be identical or sufficiently near the center wavelength of the FBGs 114, and each of the FBGs 114 partially reflects the light back towards the interrogator 106. The timing of the successively transmitted light pulses is such that the light pulses reflected by the first and second FBGs 114a, b interfere with each other at the interrogator 106, which records the resulting interference signal. The strain that the fiber segment 116 experiences alters the optical path length between the two FBGs 114 and thus causes a phase difference to arise between the two interfering pulses. The resultant optical power at the optical receiver 103 can be used to determine this phase difference. Consequently, the interference signal that the interrogator 106 receives varies with the strain the fiber segment 116 is experiencing, which allows the interrogator 106 to estimate the strain the fiber segment 116 experiences from the received optical power. The interrogator 106 digitizes the phase difference ("output signal") whose magnitude and frequency vary directly with the magnitude and frequency of the dynamic strain the fiber segment 116 experiences.

The signal processing device 118 is communicatively coupled to the interrogator 106 to receive the output signal. The signal processing device 118 includes a processor 102 and a non-transitory computer-readable medium 104 that are communicatively coupled to each other. An input device 110 and a display 108 interact with control module 250. The computer-readable medium 104 has stored on it program code to cause control module 250 to perform any suitable signal processing methods to the output signal. For example, if the fiber segment 116 is laid adjacent a region of interest that is simultaneously experiencing vibration at a rate under 20 Hz and acoustics at a rate over 20 Hz, the fiber segment 116 will experience similar strain and the output signal will comprise a superposition of signals representative of that vibration and those acoustics. Control module 250 may apply to the output signal a low pass filter with a cut-off frequency of 20 Hz, to isolate the vibration portion of the output signal from the acoustics portion of the output signal. Analogously, to isolate the acoustics portion of the output signal from the vibration portion, control module 250 may apply a high-pass filter with a cut-off frequency of 20 Hz. Control module 250 may also apply more complex signal processing methods to the output signal; example methods include those described in PCT application PCT/CA2012/000018 (publication number WO 2013/102252), the entirety of which is hereby incorporated by reference.

Figure 1B:
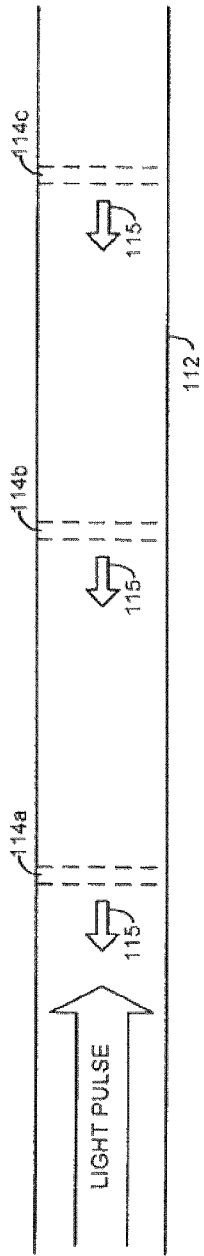
FIG. 1B is a schematic diagram that depicts how the FBGs reflect a light pulse.
Figure 1C:
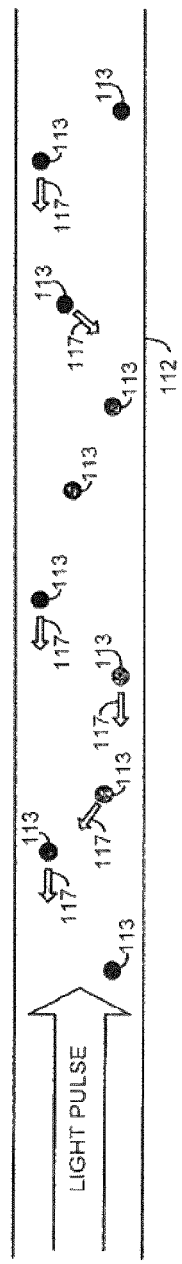
FIG. 1C is a schematic diagram that depicts how a light pulse interacts with impurities in an optical fiber that results in scattered laser light due to Rayleigh scattering, which is used for distributed acoustic sensing ("DAS")

FIG. 1B depicts how the FBGs 114 reflect the light pulse, according to another embodiment in which the optical fiber 112 comprises a third FBG 114c. In FIG. 1B, the second FBG 114b is equidistant from each of the first and third FBGs 114a,c when the fiber 112 is not strained. The light pulse is propagating along the fiber 112 and encounters three different FBGs 114, with each of the FBGs 114 reflecting a portion 115 of the pulse back towards the interrogator 106. In embodiments comprising three or more FBGs 114, the portions of the sensing and reference pulses not reflected by the first and second FBGs 114a,b can reflect off the third FBG 114c and any subsequent FBGs 114, resulting in interferometry that can be used to detect strain along the fiber 112 occurring further from the interrogator 106 than the second FBG 114b. For example, in the embodiment of FIG. 1B, a portion of the sensing pulse not reflected by the first and second FBGs 114a,b can reflect off the third FBG 114c, and a portion of the reference pulse not reflected by the first FBG 114a can reflect off the second FBG 114b, and these reflected pulses can interfere with each other at the interrogator 106.

Any changes to the optical path length of the fiber segment 116 result in a corresponding phase difference between the reflected reference and sensing pulses at the interrogator 106. Since the two reflected pulses are received as one combined interference pulse, the phase difference between them is embedded in the combined signal. This phase information can be extracted using proper signal processing techniques, such as phase demodulation. The relationship between the optical path of the fiber segment 116 and that phase difference (Θ) is as follows:

$$\Theta = 2\pi nL/\lambda,$$

where n is the index of refraction of the optical fiber, L is the physical path length of the fiber segment 116, and λ is the wavelength of the optical pulses. A change in nL is caused by the fiber experiencing longitudinal strain induced by energy being transferred into the fiber. The source of this energy may be, for example, an object outside of the fiber experiencing dynamic strain, undergoing vibration, or emitting energy.

One conventional way of determining ΔnL is by using what is broadly referred to as distributed acoustic sensing ("DAS"). DAS involves laying the fiber 112 through or near a region of interest and then sending a coherent laser pulse along the fiber 112. As shown in FIG. 1C, the laser pulse interacts with impurities 113 in the fiber 112, which results in scattered laser light 117 because of Rayleigh scattering. Vibration or acoustics emanating from the region of interest results in a certain length of the fiber becoming strained, and the optical path change along that length varies directly with the magnitude of that strain. Some of the scattered laser light 117 is back-scattered along the fiber 112 and is directed towards the optical receiver 103, and depending on the amount of time required for the scattered light 117 to reach the receiver and the phase of the scattered light 117 as determined at the receiver, the location and magnitude of the vibration or acoustics can be estimated with respect to time. DAS relies on interferometry using the reflected light to estimate the strain the fiber experiences. The amount of light that is reflected is relatively low because it is a subset of the scattered light 117. Consequently, and as evidenced by comparing FIGS. 1B and 1C, Rayleigh scattering transmits less light back towards the optical receiver 103 than using the FBGs 114.

DAS accordingly uses Rayleigh scattering to estimate the magnitude, with respect to time, of the strain experienced by the fiber during an interrogation time window, which is a proxy for the magnitude of the vibration or acoustics emanating from the region of interest. In contrast, the embodiments described herein measure dynamic strain using interferometry resulting from laser light reflected by FBGs 114 that are added to the fiber 112 and that are designed to reflect significantly more of the light than is reflected as a result of Rayleigh scattering. This contrasts with an alternative use of FBGs 114 in which the center wavelengths of the FBGs 114 are monitored to detect any changes that may result to it in response to strain. In the depicted embodiments, groups of the FBGs 114 are located along the fiber 112. A typical FBG can have a reflectivity rating of between 0.1% and 5%. The use of FBG-based interferometry to measure dynamic strain offers several advantages over DAS, in terms of optical performance.

Figure 2:
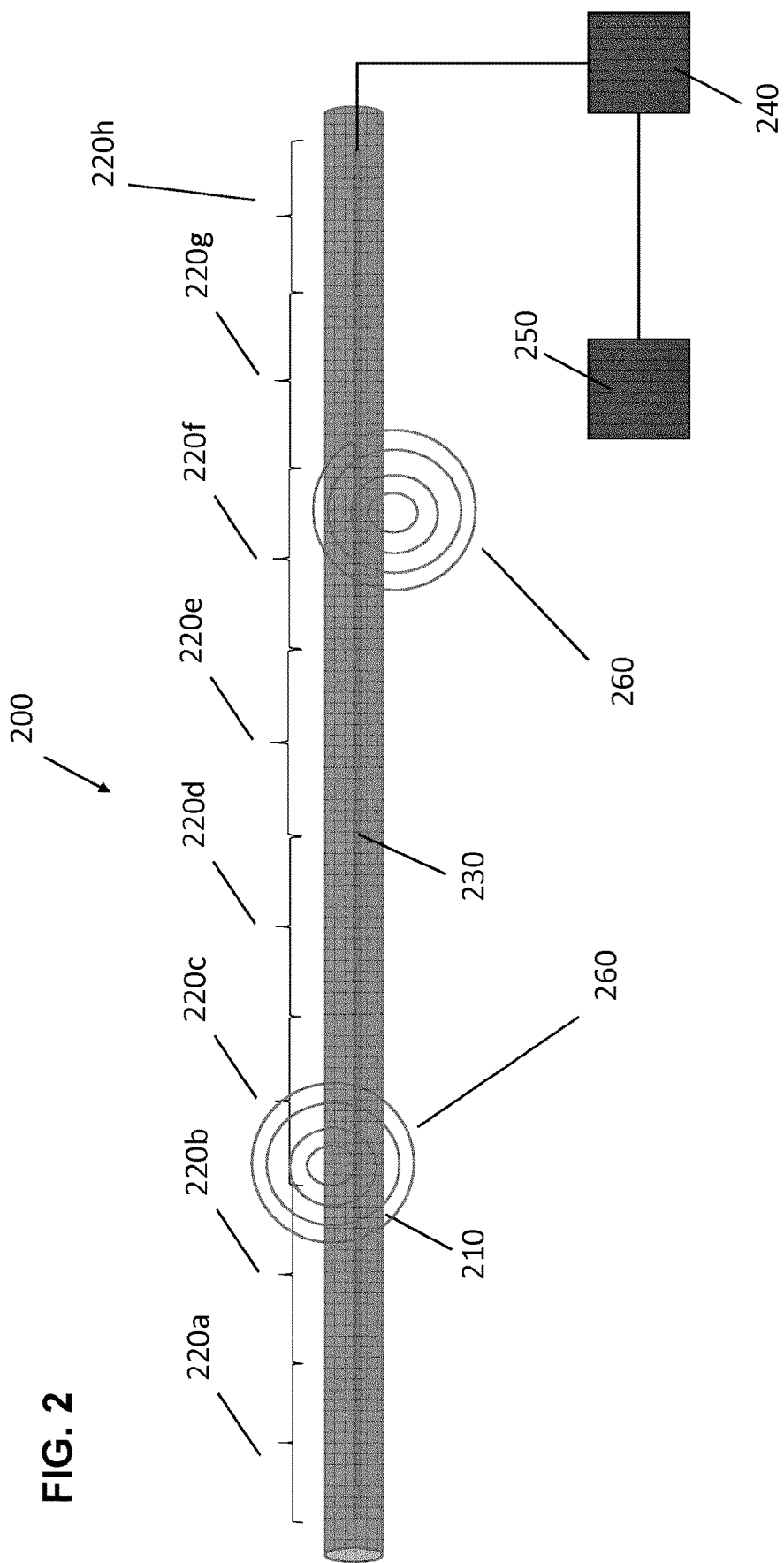
FIG. 2 is a schematic diagram of an optical interrogation system for locating an area of interest in a conduit, in accordance with an embodiment of the disclosure.

Referring now to FIG. 2, there is shown a system 200 for locating an area of interest in a fluid conduit, in accordance with an embodiment of the disclosure. FIG. 2 shows a pipeline 210 divided into multiple segments, or channels 220a-h ("channels 220"). Each channel 220 corresponds to a different portion of pipeline 210. Provided alongside pipeline 210 is a length of optical fiber 230. In some embodiments, optical fiber 230 may comprise multiple individual interconnected optical fibers. For example, in some embodiments each channel 220 may be associated with an individual length of optical fiber. In some embodiments, optical fiber 230 is attached to pipeline 210, whereas in other embodiments optical fiber 230 may be positioned within acoustic proximity of pipeline 210, meaning that optical fiber 230 is sufficiently close to pipeline 210 so as to detect acoustic energy originating from pipeline 210. Leaks 260 have occurred in portions of pipeline 200 corresponding to channels 220c and 220f.

Optical fiber 230 is optically coupled to an interrogator 240. Interrogator 240 is configured to interrogate optical fiber 230 using optical fiber interferometry, as described above. Interrogator 240 is communicatively coupled to a control module 250. Control module 250 comprises one or more processors and one or more memories comprising computer program code executable by the one or more processors and configured, when executed by the one or more processors, to cause the one or more processors to perform any of the methods described herein. In some embodiments, control module 250 may be comprised within interrogator 240 such that interrogator 240 may perform the functions of control module 250.

Figure 3:
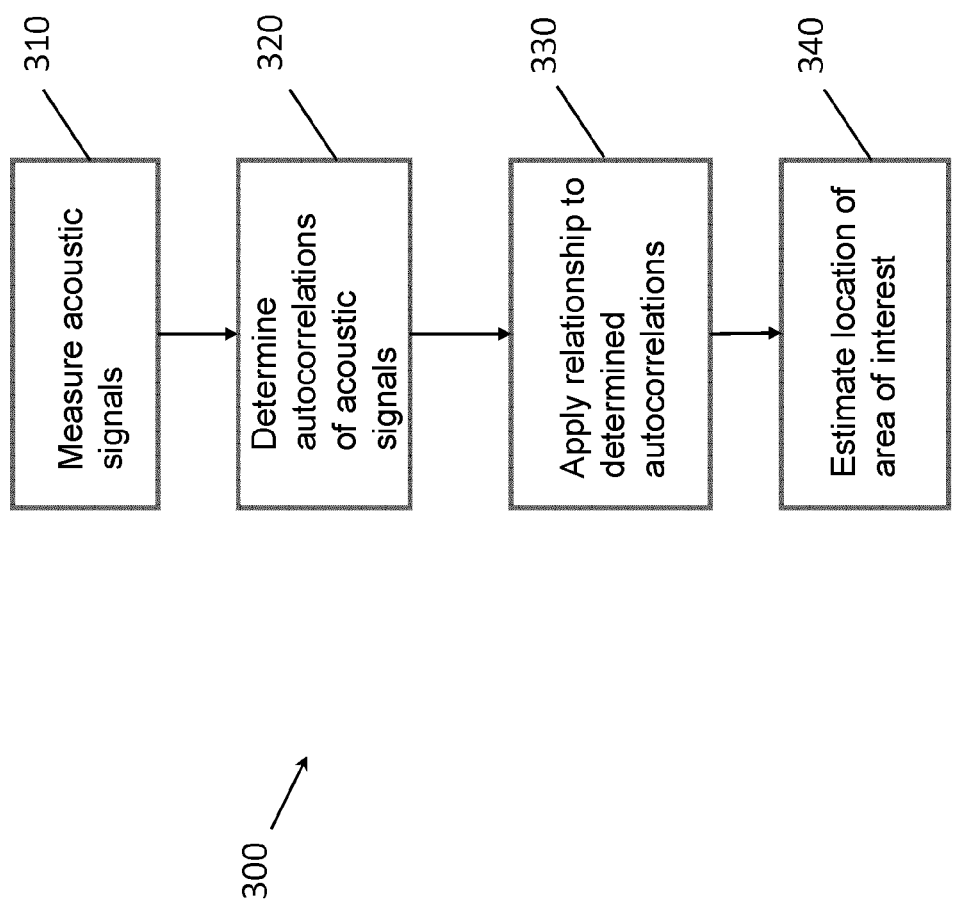
FIG. 3 is a flow diagram showing a method of locating an area of interest in a conduit, in accordance with an embodiment of the disclosure.

FIG. 3 is a flow diagram showing a general method 300 of locating an area of interest in a conduit, in accordance with an embodiment of the disclosure. The area of interest may be, for example, an acoustic source such as a leak in the conduit, or a reflective interface. Method 300 may be implemented by control module 250. At block 310, control module 250 measures multiple acoustic signals at respective multiple locations along pipeline 210. For example, control module 250 measures an acoustic signal at each of channels 220. At block 320, control module 250 determines the autocorrelation of each acoustic signal. At block 330, control module 250 applies a relationship to the determined autocorrelations. The relationship is between autocorrelations of acoustic signals measured in a modelled pipeline and modelled areas of interest in the modelled pipeline. It is assumed that the modelled pipeline is terminated at both ends such that acoustic signals propagating along the modelled pipeline reflect at its ends. At block 340, control module 250 estimates a location of the area of interest, based upon the application of the relationship to the determined autocorrelations.

There will now be described in detail a specific method of implementing the more general method 300 described above. However, persons skilled in the art will recognize that the disclosure is not limited to the more detailed method described below.

The method is directed at detecting the presence of acoustic sources and reflective interfaces in acoustic waveguides (i.e. conduits) that are terminated at both ends, using acoustic recordings obtained at fixed intervals along the waveguide. Examples of acoustic waveguides with terminations at both ends include sections of pipeline between closed valves, and wellbores. Examples of acoustic sources are leaks along a pipeline or wellbore. Examples of reflective interfaces include dents in a pipeline, changes in fluid in a wellbore (for example there could be hydrocarbon by-products in the bottom portion of the well, and water in the upper portion of the well), and roughness in the casing of a well (due to perforations). The acoustic measurements may be obtained using optical fiber interrogation, as described above. Alternatively or in addition, the acoustic measurements could be obtained using an acoustic logging tool that is moved along a wellbore at fixed intervals, or by using a series of microphones placed along a pipeline.

The method is based on interpreting the autocorrelation of each acoustic recording. The recordings may be made simultaneously or at different times. The method uses the presence of reflections occurring from the top and bottom of the waveguide. In one embodiment, the method comprises the following operations:

- 30-second acoustic recordings are obtained at locations spaced along the length of a terminated conduit.
- The autocorrelation of each acoustic recording is determined.
- The autocorrelations are analyzed in order to determine the location of acoustic sources and/or reflective interfaces along the conduit. In particular, the autocorrelations at different depths have characteristic properties that can be used to locate acoustic sources and reflective interfaces. Moreover, the location of the acoustic source (or reflective interface) can be estimated to an accuracy which is greater than the resolution of the spacing between audio recordings.

There is now derived an expression for the autocorrelation of the measured signals, with the assumption that there is an acoustic source present in the conduit. Subsequently, the expression is used to determine the location of the acoustic source.

Figure 4:
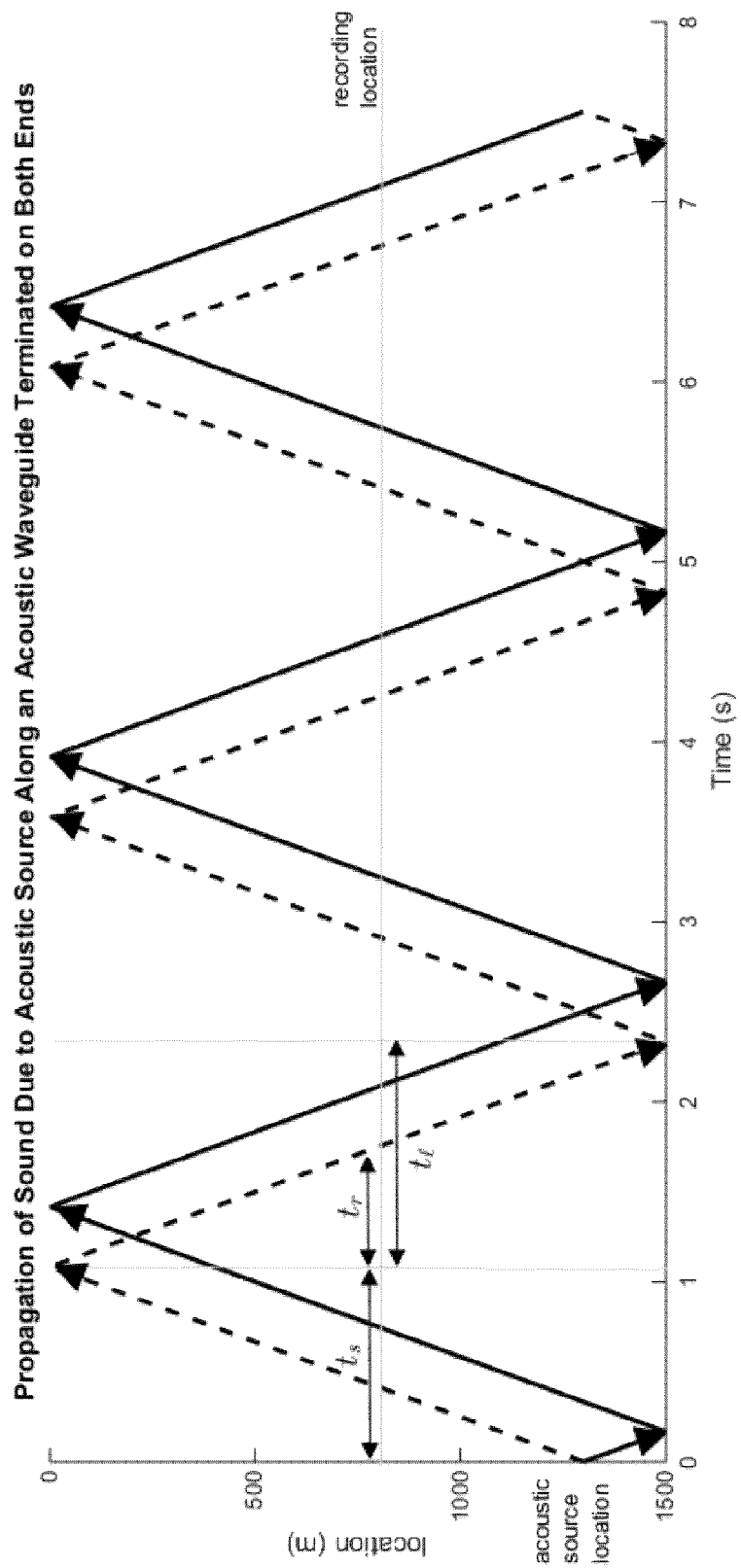
FIG. 4 is an illustration of sound propagation along a terminated conduit.

Consider how sound propagates in a terminated conduit from an acoustic source located along the conduit. Waves travel in both directions away from the source and reflect at the terminated ends of the conduit. This is illustrated in FIG. 4 which shows an illustration of sound propagation along a terminated conduit due to an acoustic source. The solid and dotted lines represent the location (in time and space) of a wavefront emitted from the acoustic source. The acoustic source is at 1300 m and is reflecting at both ends of the conduit. $t_s$ is the time it takes for sound to travel from the acoustic source to the termination at 0 m, $t_r$ is the time it takes for sound to travel from the termination at 0 m to the recording location, and $t_l$ is the time it takes for sound to travel the entire length of the conduit. Each of these times is illustrated in FIG. 4. Note that the speed of sound depends on the material through which the sound is propagating. The following is assumed:

- the speed of sound is the same in both directions along the conduit;
- the speed of sound is constant along the conduit; and
- the speed of sound is constant over time.

None of these assumptions holds exactly in practice; however for the purposes of the following derivation these assumptions are considered good enough. For instance, in a fluid-filled wellbore, the pressure of the fluid is not constant and is much higher at the bottom of the well. Therefore, the density of the fluid is higher at the bottom of the well, meaning that the speed of sound is higher at the bottom of the well than at the top. Furthermore, in a pipeline the speed of sound is not constant in both directions, due to fluid flowing in the pipeline. Sound will travel faster with the fluid flow than against it. However, the difference is usually negligible. For example, in water the speed of sound is approximately 1450 m/s, and the particle speed due to flow in a pipeline is of the order of 0.1-1 m/s. On the other hand, with accurate acoustic measurements there are advantages to estimating the difference in acoustic speeds along both directions of the pipeline. There are also additional advantages to estimating the speed of sound along a wellbore. A person skilled in the art will recognize that the methods described herein could be adapted to more accurately incorporate the changing speed of sound.

Figure 5A:
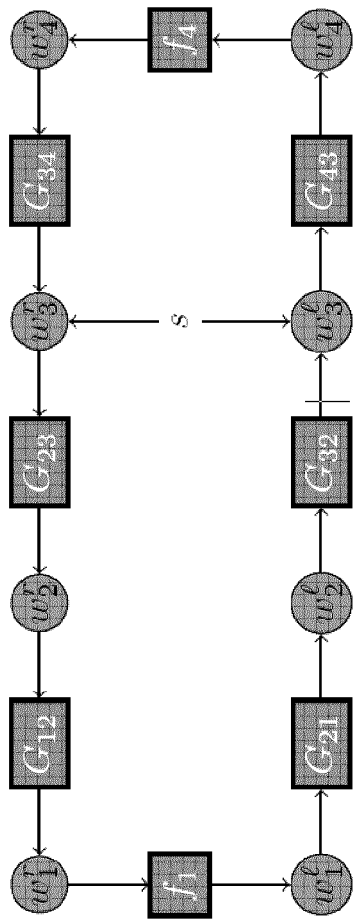
FIG. 5A is a model for acoustic propagation in a one-dimensional waveguide.

As sound propagates along a conduit it is affected by the properties of the segment or portion of the conduit (i.e. the acoustic channel) through which the sound is propagating. The acoustic channel can be modeled as a filter. For example, an acoustic channel may act as a low-pass filter with a delay (sound that passes through the channel is delayed and high-frequency sounds are attenuated more than low-frequency sounds). The filter response depends on the physics of the conduit. A block-oriented model of sound propagation in a conduit terminated at both ends is shown in FIG. 5A. In this model, the acoustic source is denoted s. The blocks denote transfer functions (i.e. filters). A circle $w_i^r$ denotes the acoustic waves traveling "to the left" at a particular location in the conduit. Similarly, $w_i^\ell$ denotes the acoustic waves traveling "to the right" at a particular location along the conduit. The circles are also referred to as nodes. The transfer function $G_{ji}$ denotes the acoustic channel response as waves propagate from node $w_i^r$ to node $w_j^r$. The transfer function $f_i$ is a reflection coefficient and is simply a constant. The acoustic channel response is modelled as an attenuation and a delay (1):

$$G_{ji}(q) = a_i q^{r_i}$$

where q is the delay operator ($q^{-1}s(t)=s(t-1)$). Waves are assumed to propagate identically in either direction, i.e. $G_{ji}=G_{ij}$. Using an acoustic sensor, waves traveling in both directions are recorded, i.e. an acoustic measurement is always a sum of right and left-moving waves:

$$w_i^m = w_i^r + w_i^\ell$$

where $w_i^m$ is the measurement at the location in the conduit corresponding to nodes $w_i^r$ and $w_i^\ell$. In the case under consideration, the acoustic sensor measures at the location corresponding to nodes $w_2^r$ and $w_2^\ell$:

$$w_m = w_2^r + w_2^\ell$$

Note that in the model shown in FIG. 5A the acoustic sensor is assumed to be to the left of the source. If the acoustic sensor is to the right of the source, the model needs to be altered as shown in FIG. 5B.

Figure 5B:
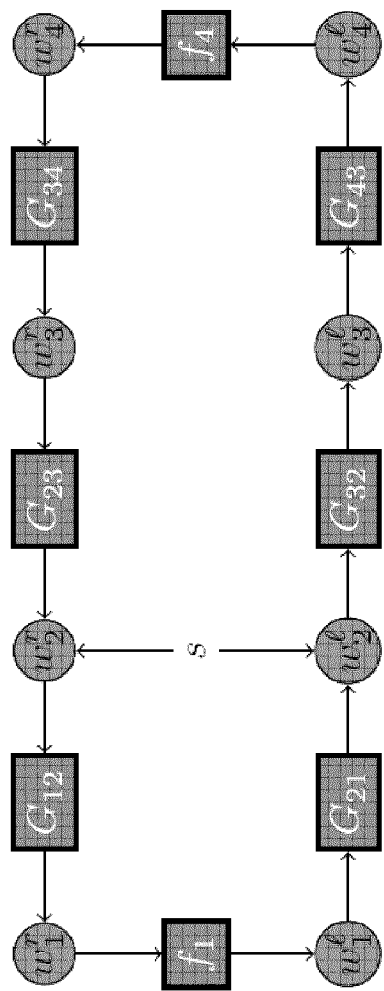
FIG. 5B is model for acoustic propagation in a one-dimensional waveguide.

It should be noted that FIGS. 5A and 5B represent merely two types of models that may be used. Other types of models may be used to model the acoustic response of the conduit, without departing from the scope of the disclosure.

Suppose that the acoustic sensor is to the left of the acoustic source (i.e. as per the model shown in FIG. 5A); then the measurement is equal to (2):

$$w_m = w_2^r + w_2^\ell$$

$$= \frac{a_2 q^{-t_2}(1 + f_1 a_1^2 q^{-2t_1})(1 + f_4 a_3^2 q^{-2t_3})}{1 - f_1 f_4 a_1^2 a_2^2 a_3^2 q^{-2t_1 - 2t_2 - 2t_3}} s(t)$$

Note that $a_i$, i=1, 2, 3 and $t_i$, i=1, 2, 3 are all functions of the location of the acoustic sensor and acoustic source. Let $d_r$, $d_s$ denote the locations of the acoustic sensor and source respectively (in meters), and let $d_\ell$ denote the total length of the conduit (in meters). In particular, from FIG. 5A we have $$t_1 = t_r = \frac{d_r}{v},$$

$$t_2 = t_s - t_r = \frac{d_s - d_r}{v},$$

$$t_3 = t_\ell - t_s = \frac{d_\ell - d_s}{v},$$

where v is the speed of sound in the conduit, and $$a_1 = e^{\frac{d_r}{d_\ell} \log \alpha},$$

$$a_2 = e^{\frac{d_s - d_r}{d_\ell} \log \alpha},$$

$$a_3 = e^{\frac{d_\ell - d_s}{d_\ell} \log \alpha},$$

where $\alpha$ is the attenuation caused by traveling one length of the conduit (the attenuation in the waveguide is assumed to only be due to distance traveled). Note that $a_1 a_2 a_3 = \alpha$, and each of $a_1$, $a_2$, and $a_3$ is proportional to its respective length $d_r$, $d_s - d_r$, and $d_\ell - d_s$. Therefore, $w_m$ can be expressed in terms of $d_r$, $d_s$, and $d_\ell$ as:

$$w_m = \frac{e^{\gamma(d_s - d_r)} q^{-\frac{2}{v}(d_s - d_r)}\left(1 + f_1 e^{2\gamma d_r} q^{-\frac{2d_r}{v}}\right)\left(1 + f_4 \alpha^2 e^{-2\gamma d_s} q^{-\frac{2(d_\ell - d_s)}{v}}\right)}{1 - f_1 f_4 \alpha^2 q^{-\frac{2d_\ell}{v}}} s(t),$$

where $$\gamma = \frac{\log \alpha}{d_\ell}.$$

for the measurements obtained at locations $d_r$ along the conduit in the case of the acoustic sensor being to the left of the acoustic source. If the analysis is repeated in the case of the acoustic sensor being to the right of the acoustic source (i.e. using the model shown in FIG. 5B), the expression for the measurement is:

$$w_m = \frac{e^{\gamma(d_r - d_s)} q^{-\frac{2}{v}(d_r - d_s)}\left(1 + f_1 e^{2\gamma d_s} q^{-\frac{2d_s}{v}}\right)\left(1 + f_4 \alpha^2 e^{-2\gamma d_r} q^{-\frac{2(d_\ell - d_r)}{v}}\right)}{1 - f_1 f_4 \alpha^2 q^{-\frac{2d_\ell}{v}}} s(t).$$

Figure 6:
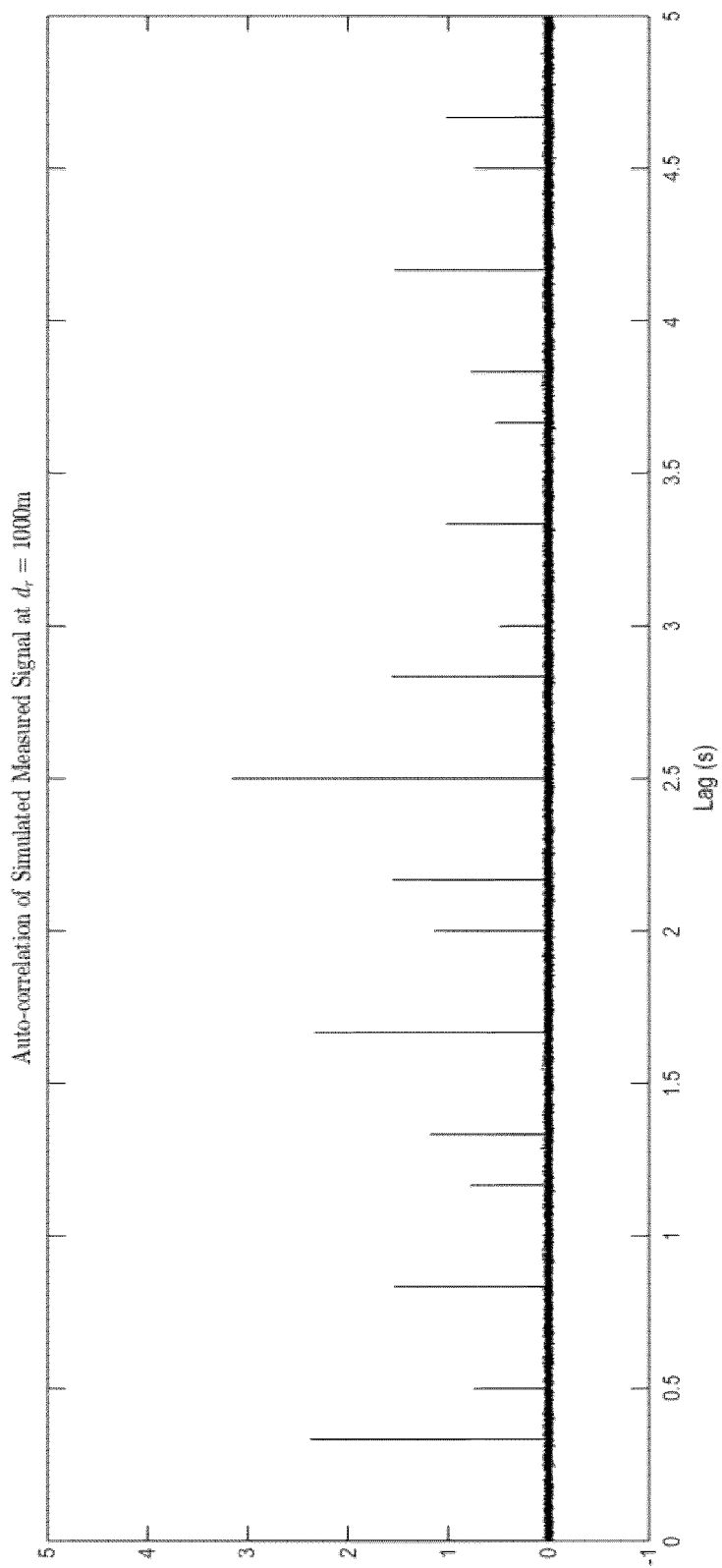
FIG. 6 is a plot of autocorrelation of a measured acoustic signal, using the model of FIG. 5A.

Using these expressions for the measured signals, the autocorrelation of $w_m$ can be calculated. By calculating the autocorrelation at various locations $d_r$, a plot can be created by stacking together the autocorrelations. Consider a conduit 1500 m long, with an acoustic source at 1300 m (i.e. $d_\ell$ =1500 m, $d_s$=1300 m). The attenuation along the conduit is chosen to be very small ($\alpha$=0.99). Let s be zero-mean Gaussian white noise. The autocorrelations of the measured signals are simulated at 5 m intervals along the conduit. The autocorrelation of $w_m$ at 1000 m is shown in FIG. 6. An important feature is that the autocorrelation is zero almost everywhere, except at a few distinct points.

Figure 7:
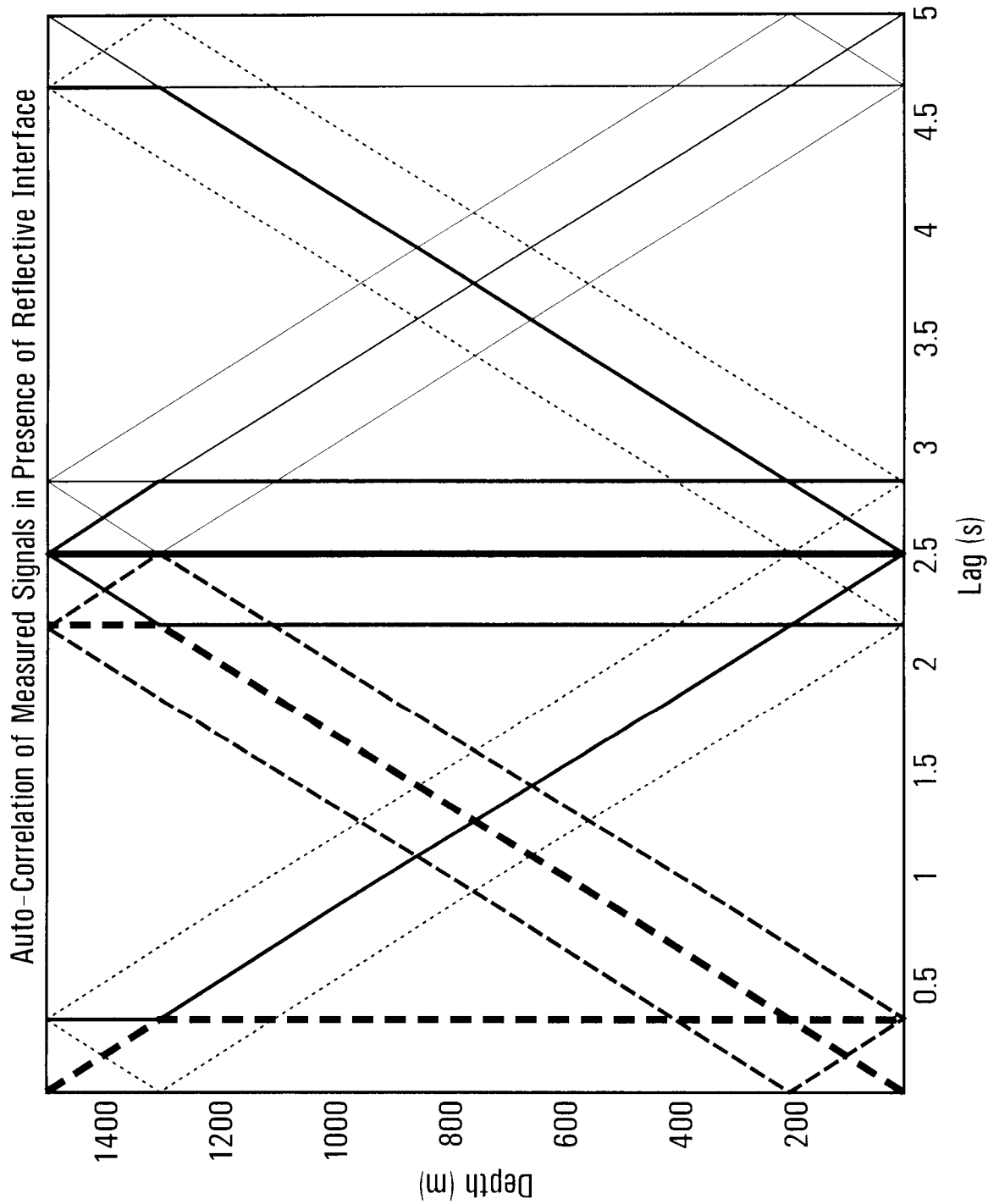
FIG. 7 is a plot of autocorrelation of a measured acoustic signal, using the models of FIGS. 5A and 5B.

When all the autocorrelations are plotted together as a function of distance, the resulting plot is shown in FIG. 7. In this case, it is clear that the distinct points shown in FIG. 6 become lines in distance and time. Based on these lines it is possible to determine the location of the acoustic source. In particular, the main lines of interest are the two diagonal lines emanating from d=1300 m (which is the location of the source) and the vertical line spaced a distance $t_s$ from the origin. The top and bottom halves of the plot are mirror images of each other (there are also diagonal lines emanating from the point d=1500−1300=200 m).

In a conduit of, for example, several kilometers, the sound is significantly attenuated as it travels the entire length of the conduit. This situation is plotted in FIG. 8. In most practical situations, the plot is more likely to look like the one shown in FIG. 8. An important feature in this plot is that the three lines of interest (the diagonal lines emanating from location $d_\ell - d_s$ and the vertical line closest to the origin) still appear.

Figure 8:
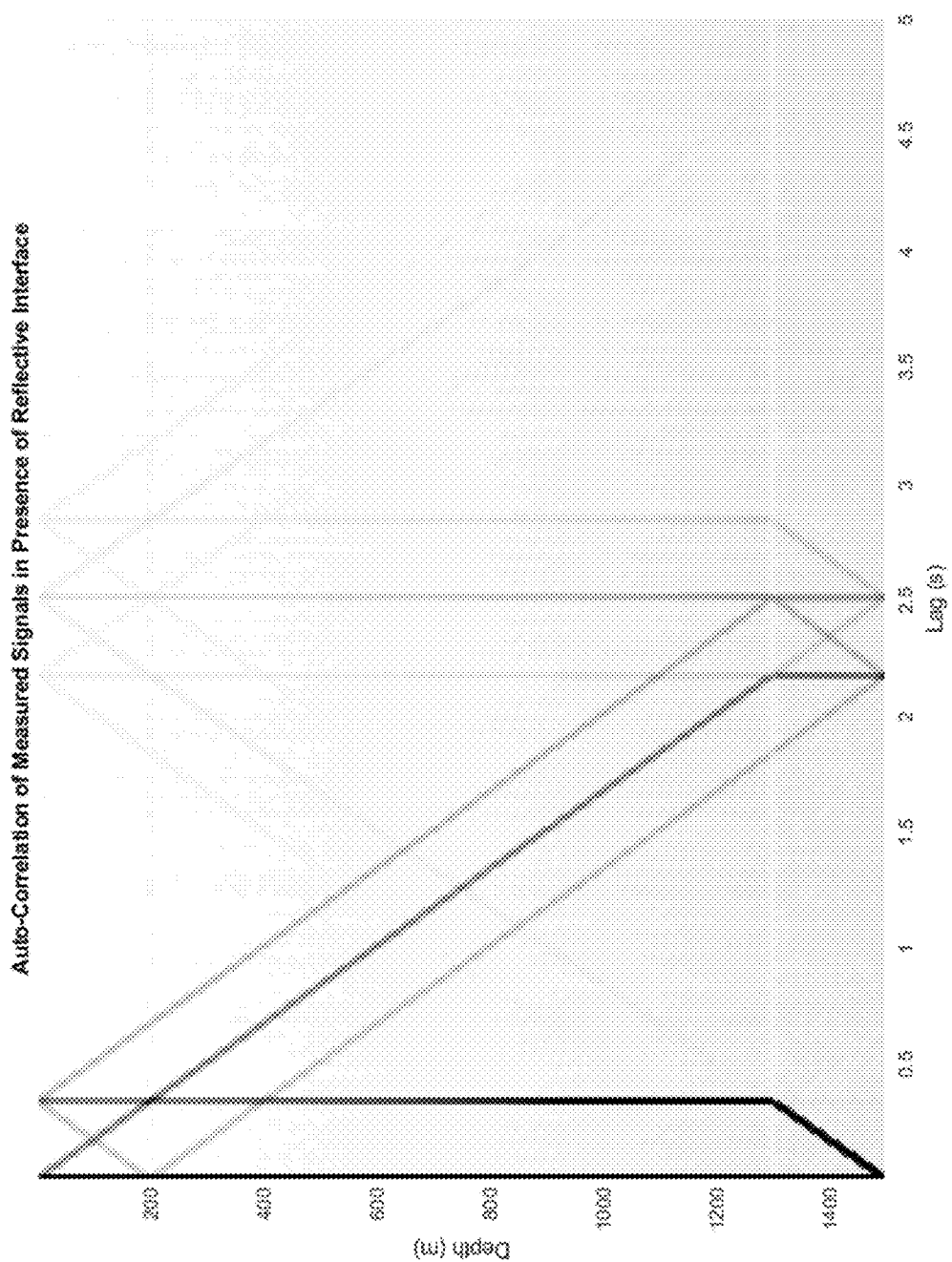
FIG. 8 is a plot of autocorrelation of a measured acoustic signal, using the models of FIGS. 5A and 5B.

In the following, expressions are derived for the lines shown in FIGS. 7 and 8. These expressions are based on analyzing the autocorrelation of $w_m$. The analysis is focused on the situation where there is a significant amount of attenuation in the acoustic channel. This simplifies the analysis, and most conduits of a practical length do exhibit significant attenuation.

Because most acoustic channels have high attenuation, $\alpha^2$ is assumed to be very close to zero (i.e. negligible). Equivalently, this means that an acoustic wave does not propagate further than twice the length of the conduit. Applying this assumption to (2) results in (3):

$$w_m(t) \approx e^{\gamma(d_s - d_r)} s(t - t_s + t_r) + f_4 \alpha^2 e^{-\gamma(d_r + d_s)} s(t - 2t_\ell + d_r + d_s) + f_1 e^{\gamma(2d_s - d_r)} s(t - 2t_s + t_r)$$

for the case where the measurement location is to the left of the acoustic source, and (4)

$$w_m(t) \approx e^{\gamma(d_s - d_r)} s(t - t_r + t_s) + f_4 \alpha^2 e^{-\gamma(d_r + d_s)} s(t - 2t_\ell + t_r + t_s) + f_1 e^{\gamma(2d_r - d_s)} s(t - 2t_r + t_s)$$

for the case where the measurement location is to the right of the acoustic source.

In order to calculate the autocorrelation of the measured signal, s(t) is assumed to be white noise with variance $\sigma^2$ (i.e $\mathbb{E}[s^2(t)] = \sigma^2$, where $\mathbb{E}$ is the expected value operator). Let $\sigma_w^2$ denote the variance of $w_m$. Then, from (3), the autocorrelation of $w_m(t)$ when the measurement location is to the left of the acoustic source is equal to (5):

$$R_w(\tau, d_r) = \mathbb{E}[w_m(t, d_r) w_m(t - \tau, d_r)]$$

$$\approx \begin{cases} \sigma_w^2 & \tau = 0, \\ f_4 \alpha e^{-\gamma d_s} \sigma^2 & \tau = \pm 2\dfrac{d_\ell - d_s}{v}, \\ f_1 e^{\gamma d_r} \sigma^2 & \tau = \pm 2\dfrac{d_r}{v}, \\ f_1 f_4 e^{\gamma(d_r + 2d_\ell - 2d_s)} \sigma^2 & \tau = \pm 2\dfrac{d_r - d_\ell + d_s}{v}, \\ 0 & \text{otherwise.} \end{cases}$$

Similarly, from (4) the autocorrelation of $w_m$ in the case where the measurement location is to the right of the acoustic source is equal to (6):

$$R_w(\tau, d_r) = \mathbb{E}[w_m(t, d_r) w_m(t - \tau, d_r)]$$

$$\approx \begin{cases} \sigma_w^2 & \tau = 0, \\ f_4 \alpha e^{-\gamma d_r} \sigma^2 & \tau = \pm 2\dfrac{d_\ell - d_r}{v}, \\ f_1 e^{\gamma d_s} \sigma^2 & \tau = \pm 2\dfrac{d_s}{v}, \\ f_1 f_4 e^{\gamma(d_r + 2d_\ell - 2d_s)} \sigma^2 & \tau = \pm 2\dfrac{d_r - d_\ell + d_s}{v}, \\ 0 & \text{otherwise.} \end{cases}$$

From (5) it is clear that the autocorrelation of $w_m$ at a particular location is mostly zero, except at six points. When a plot is made with varying $d_r$ and $\tau$, these points form lines. In the following numbered list, the lines are derived. The numbers in this list correspond to the numbered lines in FIG. 8. Note that in FIG. 8 the y-axis is reversed. This means that a line with positive slope actually appears in the plot as if it has negative slope.

1. From the second case in (5):

$$\tau = \frac{2(d_\ell - d_s)}{v} = 2(t_\ell - t_s).$$

Both $t_\ell$ and $t_s$ are constants, and therefore this is a vertical line. Note that $\tau = 2(t_\ell - t_s)$ is also a vertical line, but corresponds to negative $\tau$ and so does not appear in the plot of FIG. 8.

2. From the third case in (5):

$$d_r = \frac{v}{2}\tau.$$

This is a line with a y-intercept at 0 m, and a slope of $$\frac{v}{2}.$$

Note that $$d_r = -\frac{v}{2}\tau$$

does not appear in the plot for $\tau > 0$.

3. From the fourth case in (5):

$$d_r = -\frac{v}{2} + d_\ell - d_s.$$

This is a line with slope $$-\frac{v}{2}$$

and y-intercept $d_\ell - d_s$.

4. From the fourth case in (5):

$$d_r = \frac{v}{2} + d_\ell - d_s.$$

This is a line with slope $$\frac{v}{2}$$

and y-intercept $d_\ell - d_s$.

5. From the third case in (6):

$$d_r = \frac{v}{2} + d_\ell.$$

This is a line with slope $$\frac{v}{2}$$

and y-intercept $d_\ell$. Note that the line $$d_r = -\frac{v}{2} + d_\ell$$

does not appear in the plot for $\tau > 0$.

6. From the third case in (6): $\tau = 2t_s$. This is a vertical line. The line $\tau = -2t_s$ does not appear on the plot for $\tau > 0$.

The remaining case in (6) is the same line as the third case in (5). The key feature of these lines is that using lines 1, 3, 4 and 6 it is possible to determine the location of the acoustic source.

Interestingly, lines 3 and 4 have y-intercepts $d_\ell - d_s$, not $d_s$. There are no lines with a y-intercept at $d_s$ in the situation under consideration (high attenuation in the conduit).

It is now possible to estimate the location of the acoustic source. There exist several options. It is supposed that the conduit has high attenuation and only the four lines described above are visible in the plot. In this case, the y-intercept of lines 3 and 4, which is equal to $d_\ell - d_s$, can be obtained from the plot. Secondly, the lags of the two vertical lines can be determined. Thus, we have the following equations:

$$y = d_\ell - d_s$$

$$v_1 = \frac{2}{v}(d_\ell - d_s)$$

$$v_2 = \frac{2}{v}d_s$$

where y is the y-intercept of lines 3 and 4, and $v_1$ and $v_2$ are the lags corresponding to vertical lines 1 and 6. Using these equations, it is possible to solve for $d_s$:

$$d_s = \frac{yv_2}{v_1}$$

which is the estimate for the location of the acoustic source.

If more lines are available, then the additional equations should be included in the optimization to determine the best estimate of $d_s$.

In some cases $d_\ell$ is known. This can also be incorporated resulting in the following estimate of $d_s$:

$$d_s = \frac{1}{2}(d_\ell - y) + \frac{d_\ell}{2}\frac{v_2}{v_1 + v_2}$$

It may also be possible to estimate v from the slope of the lines. In this case some care needs to be taken since the speed of sound is not a constant. In particular, in a wellbore the pressure and temperature of the fluid in the wellbore change, affecting the speed of sound. However, with appropriate investigation a person skilled in the art may determine how the slopes of the lines can be used to accurately estimate v at the location of the acoustic source.

There are now presented two field examples to which are applied the above-described acoustic source detection method.

Figure 9:
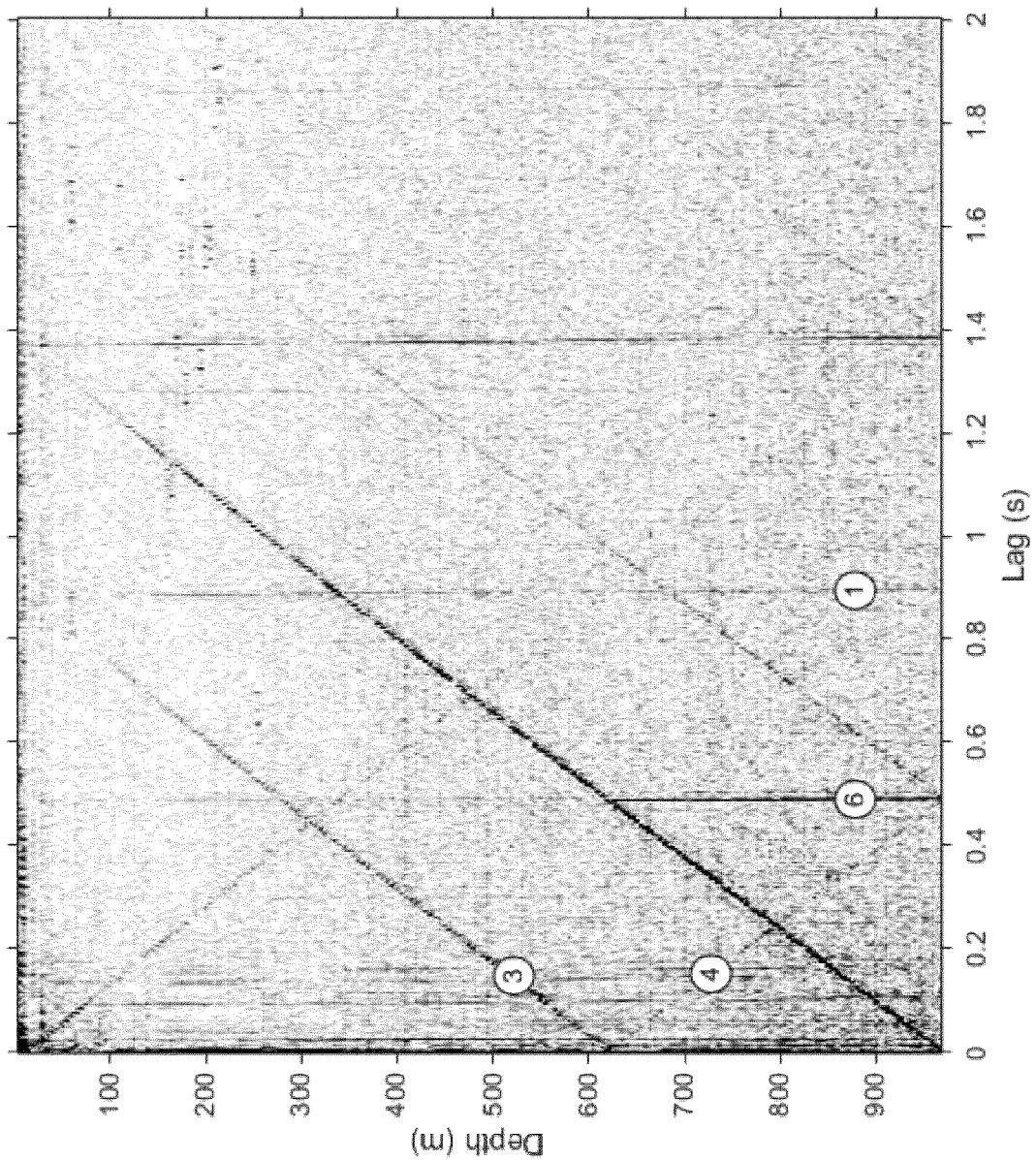
FIG. 9 is a plot of autocorrelation of field data collected using an acoustic logging tool.

Turning to FIG. 9, the data for this plot was collected using an acoustic sensor that was moved along a wellbore. The sensor was moved at 5 m increments and at each depth 30 s of acoustic data was collected. The lines 1-6 are all visible on the plot. The length of the wellbore in this case is 970.5 m. From the plot, the y-intercept of lines 3 and 4, and the time lag of the vertical lines 1 and 6, are:

y=625.7 m,
$v_1$=0.487 s,
$v_2$=0.8903 s.

From (7), the resulting estimate for the acoustic source depth is 343.6 m. Using other methods, the leak location was estimated to be 340±5 m.

Figure 10:
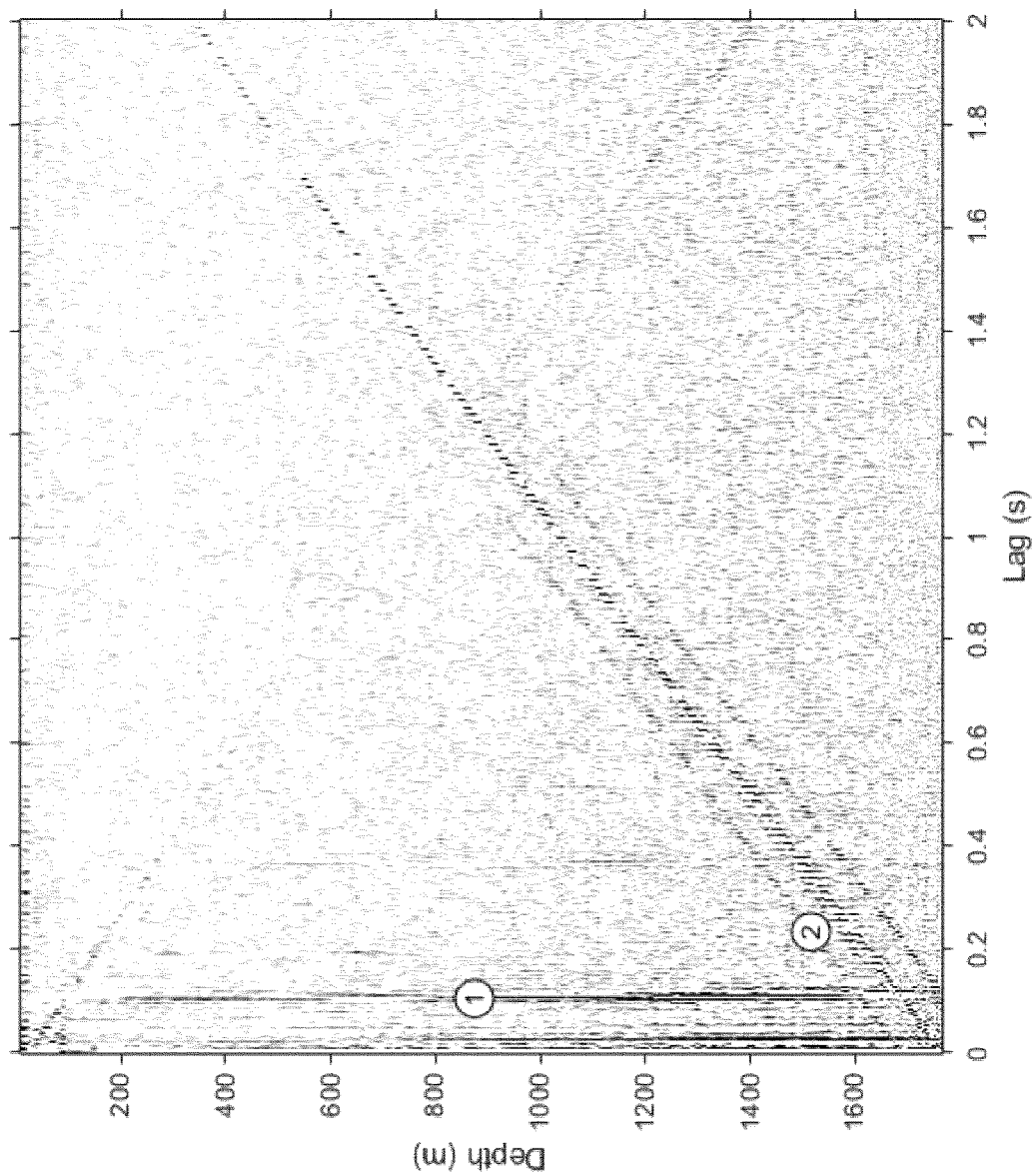
FIG. 10 is a plot of autocorrelation of field data collected using an acoustic logging tool.

A second example is shown in FIG. 10. Again, this data was collected using an acoustic sensor that was moved along a wellbore. The sensor was moved at 5 m increments and at each depth 30 s of acoustic data was collected. In this case, only lines 1, 2, 4 and 5 are visible. However, the length of the wellbore is known to be 1764 m. The y-intercept of line 4 is 1686 m. Therefore, the depth of the acoustic source is estimated to be $d_s$=1764−1686=78 m. Using other methods, the depth of the acoustic source was determined to be 75±5 m. The estimate is very close to the previously determined source location.

In addition to acoustic sources, conduits can comprise reflective interfaces. The reflective interface can be due, for example, to partial blockages, roughness of the conduit walls, or changes in material of the conduit. A method is now presented to determine the location of a reflective interface based on the autocorrelation plots, as described above. Furthermore, the circumstances under which it is possible to distinguish between an acoustic source and a reflective interface are determined, based on the autocorrelation plot. The line of reasoning to locate reflective interfaces is the same as that presented above in respect of acoustic source localization.

Figure 11A:
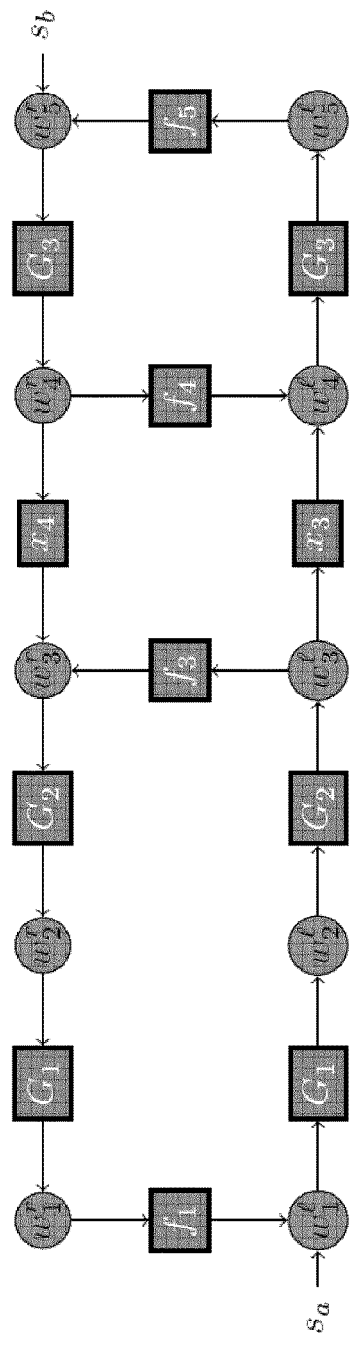
FIG. 11A is a model for acoustic propagation in a one-dimensional waveguide, with a reflective interface along the waveguide.

One example of a block-oriented model representing a reflective interface in a conduit is shown in FIG. 11A. The reflective interface is modeled using the reflection coefficients $f_3$ and $f_4$, and the transmission coefficients $x_3$ and $x_4$. All four of these coefficients are constants. For the model shown in FIG. 11A, the measurement obtained using an acoustic sensor is $w_m = w_2^r + w_2^\ell$. The measurement location in this case is to the left of the reflective interface. It is assumed that there are acoustic sources present at both ends of the conduit. The acoustic sources are denoted $s_a$ and $s_b$.

Figure 11B:
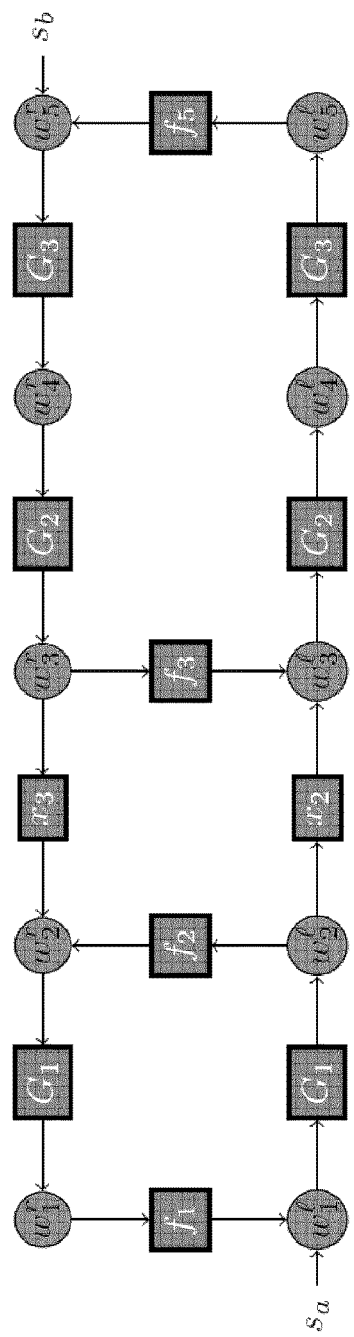
FIG. 11B is a model for acoustic propagation in a one-dimensional waveguide, with a reflective interface along the waveguide.

In the situation that the measurement location is to the right of the reflective interface, the model shown in FIG. 11B can be used.

It should be noted that FIGS. 11A and 11B represent merely two types of models that may be used. Other types of models may be used to model the acoustic response of the conduit, without departing from the scope of the disclosure.

From the model of FIG. 11A, the measurement when the sensor is to the left of the interface can be expressed as:

$$\omega_m = \omega_m^r + \omega_2^\ell$$

$$= \frac{G_1(1 + f_3 G_2^2 - f_5 f_4 G_3^2 - f_5 f_3 f_4 G_2^2 G_3^2 + f_5 f_3 f_4 G_2^2 G_3^2)}{1 - f_4 f_5 G_3^2 - f_1 f_3 G_1^2 G_2^2 + f_1 f_3 f_4 f_5 G_1^2 G_2^2 G_3^2 - f_1 f_5 x_2 x_3 G_1^2 G_2^2 G_3^2} s_a +$$

$$\frac{t_3 G_2 G_3(1 + f_1 G_1^2)}{1 - f_4 f_5 G_3^2 - f_1 f_3 G_1^2 G_2^2 + f_1 f_3 f_4 f_5 G_1^2 G_2^2 G_3^2 - f_1 f_5 x_2 x_3 G_1^2 G_2^2 G_3^2} s_b$$

From the model of FIG. 11B, the measurement when the sensor is to the right of the interface can be expressed as:

$$\omega_m = \omega_m^r + \omega_2^\ell$$

$$= \frac{x_3 G_2 G_1(1 + f_5 G_3^2)}{1 - f_4 f_1 G_1^2 - f_5 f_3 G_3^2 G_2^2 + f_5 f_3 f_2 f_1 G_1^2 G_2^2 G_3^2 - f_1 f_5 x_2 x_3 G_1^2 G_2^2 G_3^2} s_a +$$

$$\frac{G_3(1 + f_3 G_2^2 - f_1 f_2 G_1^2 - f_1 f_3 f_4 G_2^2 G_1^2 + f_1 f_3 f_4 G_2^2 G_1^2)}{1 - f_2 f_1 G_1^2 - f_5 f_3 G_3^2 G_2^2 + f_1 f_3 f_2 f_5 G_1^2 G_2^2 G_3^2 - f_1 f_5 x_2 x_3 G_1^2 G_2^2 G_3^2} s_b$$

It is assumed that the channel transfer functions $G_1$, $G_2$ and $G_3$ can be modelled as in (1). Again, $G_1$, $G_2$ and $G_3$ are to be expressed in terms of $d_r$, $d_\ell$ and $d_i$, where $d_i$ is the location of the reflective interface. For the model of FIG. 11A, we have:

$$G_1 = e^{\frac{d_r}{d_\ell}\log a} q^{-\frac{d_r}{v}},$$

$$G_2 = e^{\frac{d_i - d_r}{d_\ell}\log a} q^{-\frac{d_i - d_r}{v}},$$

$$G_3 = e^{\frac{d_\ell - d_i}{d_\ell}\log a} q^{-\frac{d_\ell - d_i}{v}}.$$

For the model of FIG. 11B, we have:

$$G_1 = e^{\frac{d_i}{d_\ell}\log\alpha} q^{-\frac{d_i}{v}},$$

$$G_2 = e^{\frac{d_r-d_i}{d_\ell}\log\alpha} q^{-\frac{d_r-d_i}{v}},$$

$$G_3 = e^{\frac{d_\ell-d_r}{d_\ell}\log\alpha} q^{-\frac{d_\ell-d_r}{v}}.$$

Figure 12:
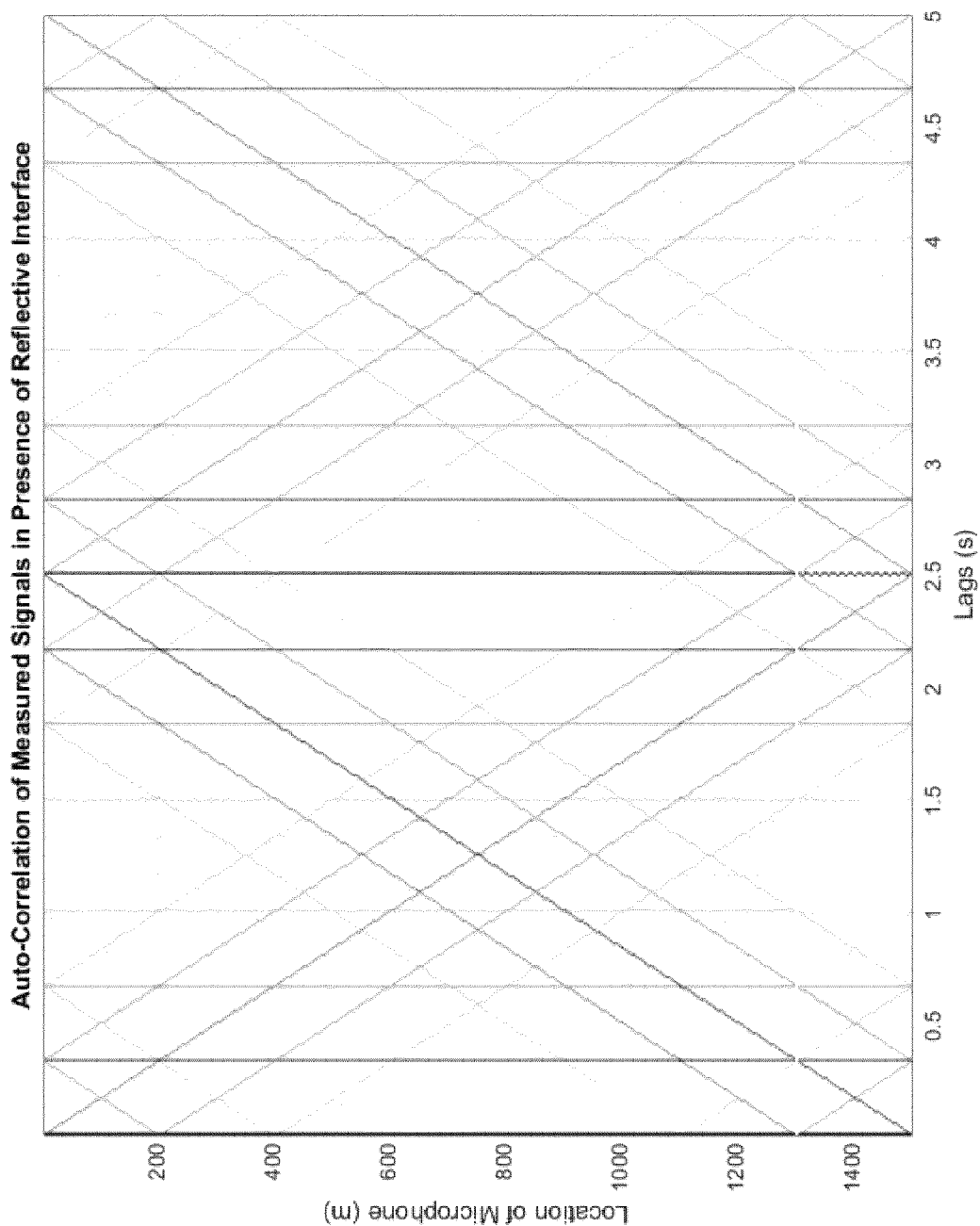
FIG. 12 is a plot of autocorrelation of a measured acoustic signal, using the model of FIG. 11A.

Using the expressions (8) and (9) and calculating their autocorrelations, a plot of the auto-correlation of the measurements for various locations along a conduit can be generated. For example, consider a conduit of length 1500 m, with a reflective interface at 1300 m. Suppose that the reflective interface is such that 10% of the power is reflected, and 90% of the power is transmitted. Suppose the reflective interface is symmetric (i.e. $f_3=f_4=0.3162$ and $x_2=x_3=0.9487$). Suppose that waves are not substantially attenuated as they pass the entire length of the waveguide ($\alpha=0.9$). This means that waves are reflected many times and travel the length of the conduit many times. The resulting plot is shown in FIG. 12. As can be seen from the plot, there are many more diagonal lines than in the case analyzed above in connection with the acoustic source localization method.

In practice, waves will be attenuated. Thus, if $\alpha$ is decreased to 0.5, the resulting plot is shown in FIG. 13.

Figure 13:
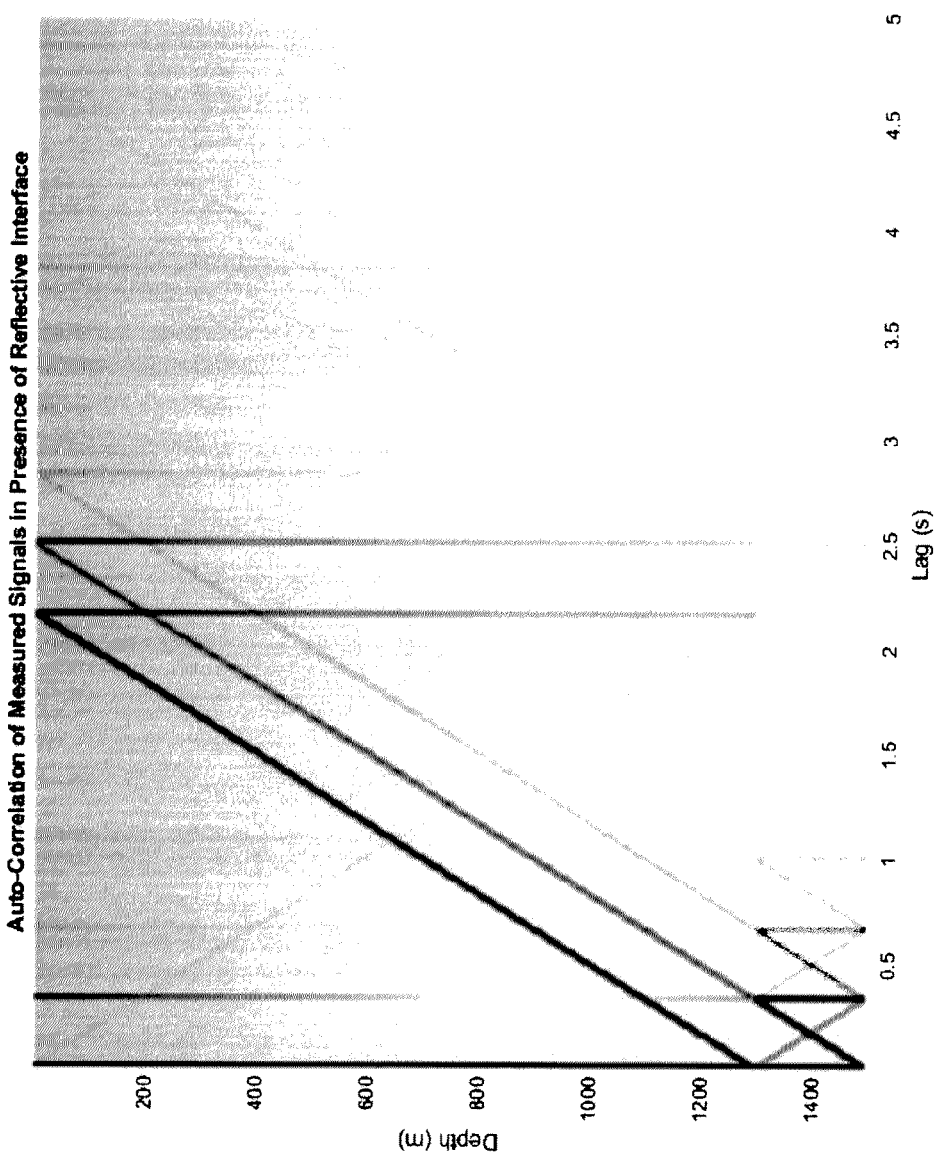
FIG. 13 is a plot of autocorrelation of a measured acoustic signal, using the model of FIG. 11A.

Next, expressions for the lines in the plot of FIG. 13 are obtained. Similarly to the analysis presented above, the expression for the measured signal is simplified by assuming that after three reflections a wave is essentially dissipated. Equivalently, this means that any product involving three or more of $f_1$, $f_3$, $f_4$ and $f_5$ is zero. Let $$\frac{\log\alpha}{d_\ell} = \gamma.$$

From (8) and (10), the measured signal when the acoustic sensor is to the left of the reflective interface is approximately equal to:

$$w_m(t) \approx e^{\gamma d_r} s_a(t-t_r) + f_3 e^{\gamma(d_r-2d_i)} s_a(t-t_r+2t_i) + f_1 f_3 e^{\gamma(d_r+2d_i)}$$
$$s_a(t-t_r-2t_i) + x_3 x_4 f_5 a^2 e^{-\gamma d_r} s_a(t-2t_\ell+t_r) +$$
$$x_3 x_4 f_1 f_5 a^2 e^{-\gamma d_r} s_a(t-2t_\ell-t_r) + x_4 a e^{-\gamma d_r} s_b(t-t_\ell+t_r) +$$
$$x_3 x_4^2 f_1 f_3 a^3 e^{-\gamma d_r} s_b(t-3t_\ell+t_r) + x_4 f_1 f_3 a e^{\gamma(-d_r-2d_i)}$$
$$s_b(t-d_\ell+t_r-t_i) + x_4 f_5 f_4 a^3 e^{\gamma(-2d_i-d_r)} s_b(t-3t_\ell+$$
$$2t_i+t_r) + x_4 f_1 a e^{\gamma d_r} s_b(t-t_\ell+t_r) \quad (12)$$

where $t_r$, $t_i$ and $t_\ell$ can be converted to $d_r$, $d_i$ and $d_\ell$ by dividing by v, the speed of sound in the conduit. Under the same assumptions, the measured signal in the case that the acoustic sensor is to the right of the reflective interface is:

$$w_m(t) \approx x_2 e^{\gamma d_r} s_a(t-t_r) + r^2 f_1 f_2 e^{\gamma(-d_r+2d_i)} s_a(t+t_r-2t_i) +$$
$$x_2 f_5 a e^{\gamma d_r} s_a(t-2t_\ell+t_r) + f_3 f_5 x_2^2 x_3 a^2 e^{-\gamma d_r} s_a(t-$$
$$2t_\ell-t_r) + f_3 f_5 x_2 a^2 e^{\gamma(2d_i+d_r)} s_a(t-2t_\ell+2t_i-t_r) +$$
$$e^{-\gamma d_i} s_b(t-t_i) + x_2 f_3 f_1 e^{-\gamma(2d_r+d_i)} s_b(t-2t_r-t_i) + f_3 e^{-\gamma}$$
$$(2d_r+3d_i) s_b(t-2t_r-3t_i) + f_3 f_5 a^2 e^{\gamma(3d_i)} s_b(t-2t_\ell+$$
$$3t_i) + f_1 f_5 a e^{\gamma d_i} s_b(t-t_\ell-t_i).$$

Let $\sigma_a^2$ and $\sigma_b^2$ be the variance of $s_a$ and $s_b$, respectively. Assuming that $s_a$ and $S_b$ are uncorrelated, then, from (12), the autocorrelation in the case that the acoustic sensor is to the left of the reflective interface is (14):

$$R_\omega(\tau, d_r) = \mathbb{E}[\omega_m(t, d_r)\omega_m(t-\tau, d_r)]$$

$$\approx \begin{cases} \sigma_\omega^2 & \tau = 0. \\ f_3 e^{2\gamma d_i} \sigma_b^2 & \tau = \pm\frac{2}{v}(d_i - d_r). \\ f_1 f_2 x_2^2 e^{2\gamma(d_r+d_i)} \sigma_a^2 + \\ f_1 f_3 x_2 x_3 e^{4\gamma d_r} \sigma_b^2 & \tau = \pm\frac{2}{v}d_i. \\ f_3 f_5 x_2^2 a^2 e^{2\gamma(d_r-d_i)} \sigma_a^2 + \\ f_3 f_5 a^2 \sigma_b^2 & \tau = \pm\frac{2}{v}(d_\ell - d_i). \\ f_5 x_2^2 a^2 \sigma_a^2 & \tau = \pm\frac{2}{v}(d_\ell - d_r). \\ f_3 f_5 x_2^3 x_3 e^{2\gamma d_r} \sigma_a^2 + \\ f_1 f_5 x_2 x_3 a^2 e^{2\gamma d_i} \sigma_b^2 & \tau = \pm\frac{2}{v}d_\ell. \\ x_2 x_3 f_1 e^{2\gamma(d_r+d_i)} \sigma_b^2 & \tau = \pm\frac{2}{v}d_r. \\ 0 & \text{otherwise.} \end{cases}$$

Similarly, in the case the acoustic sensor is to the right of the reflective interface (15):

$$R_\omega(\tau, d_r) = \mathbb{E}[\omega_m(t, d_r)\omega_m(t-\tau, d_r)]$$

$$\approx \begin{cases} \sigma_\omega^2 & \tau = 0. \\ f_3 e^{2\gamma d_r} \sigma_a^2 & \tau = \pm\frac{2}{v}(d_i - d_r). \\ f_1 f_3 e^{2\gamma(d_r+d_i)} |\sigma_a^2 + \\ x_4^2 f_1 f_3 a^2 e^{2\gamma(-d_r+d_i)} \sigma_b^2 & \tau = \pm\frac{2}{v}d_i. \\ x_3 x_4 f_5 f_3 a^2 e^{2\gamma(-d_r+d_i)} \sigma_a^2 + \\ x_4^2 f_4 f_5 a^4 e^{2\gamma(-d_i-d_r)} \sigma_b^2 & \tau = \pm\frac{2}{v}(d_\ell - d_i). \\ x_3 x_4 f_5 a^2 \sigma_a^2 & \tau = \pm\frac{2}{v}(d_\ell - d_r). \\ f_1 f_5 x_3 x_4 a^2 e^{2\gamma d_r} \sigma_a^2 + \\ x_3 x_4^3 f_1 f_3 a^4 e^{-2\gamma d_r} \sigma_b^2 & \tau = \pm\frac{2}{v}d_\ell. \\ x_4^2 f_1 a^2 \sigma_b^2 & \tau = \pm\frac{2}{v}d_r. \\ 0 & \text{otherwise.} \end{cases}$$

Again, it appears that the autocorrelations (14) and (15) are non-zero only at discrete points. When a plot is made with varying $d_r$ and $\tau$, these points form lines. Interestingly, both (14) and (15) define the same lines in the $(\tau, d_r)$ space. In the following numbered list, the lines are derived. The numbers in this list correspond to the numbered lines in FIG. 13. Note that in FIG. 13 the y-axis is reversed. This means that a line with positive slope actually appears on the plot as if it had negative slope.

1. From the second case in (14):

$$d_r = \pm\frac{v}{2}\tau + d_i.$$

These are two diagonal lines with y-intercept at $d_i$ and slope $$\pm\frac{v}{2}.$$

2. From the third case in (14): $\tau=2t_i$. This is a vertical line.

3. From the fourth case in (14): $\tau=2(t_\ell-t_i)$. This is a vertical line.

4. From the fifth case in (14):

$$d_r = -\frac{v}{2}\tau + d_\ell.$$

This is a line with slope $$-\frac{v}{2}$$

and y-intercept $d_\ell$.

5. From the sixth case in (14): $\tau=2t_\ell$. This is a vertical line.

6. From the seventh case in (14):

$$d_r = \frac{v}{2}\tau.$$

This is a line with slope $$\frac{v}{2}$$

and y-intercept 0.

Similarly to the situation where there is an acoustic source present, the lines 1, 2 and 3 can be used to determine the location of the reflective interface. Let y denote the y-intercept of line 1. Let $v_1$ and $v_2$ be the time lags corresponding to vertical lines 2 and 3. Note that y, $v_1$ and $v_2$ can be read of a plot constructed using field data. Then:

$$y = d_i,$$

$$v_1 = \frac{2}{v}d_i,$$

$$v_2 = \frac{2}{v}(d_\ell - d_i).$$

If the length of the conduit is not known, then only the first equation can be used to estimate the location of the reflective interface. However, if the length of the conduit is known, then the equations can be combined with the resulting estimate:

$$d_i = \frac{1}{2}y + \frac{1}{2}\frac{v_1 d_\ell}{v_1 + v_2}.$$

There are now presented two field examples to which were applied the above-described reflective interface detection method.

Figure 14:
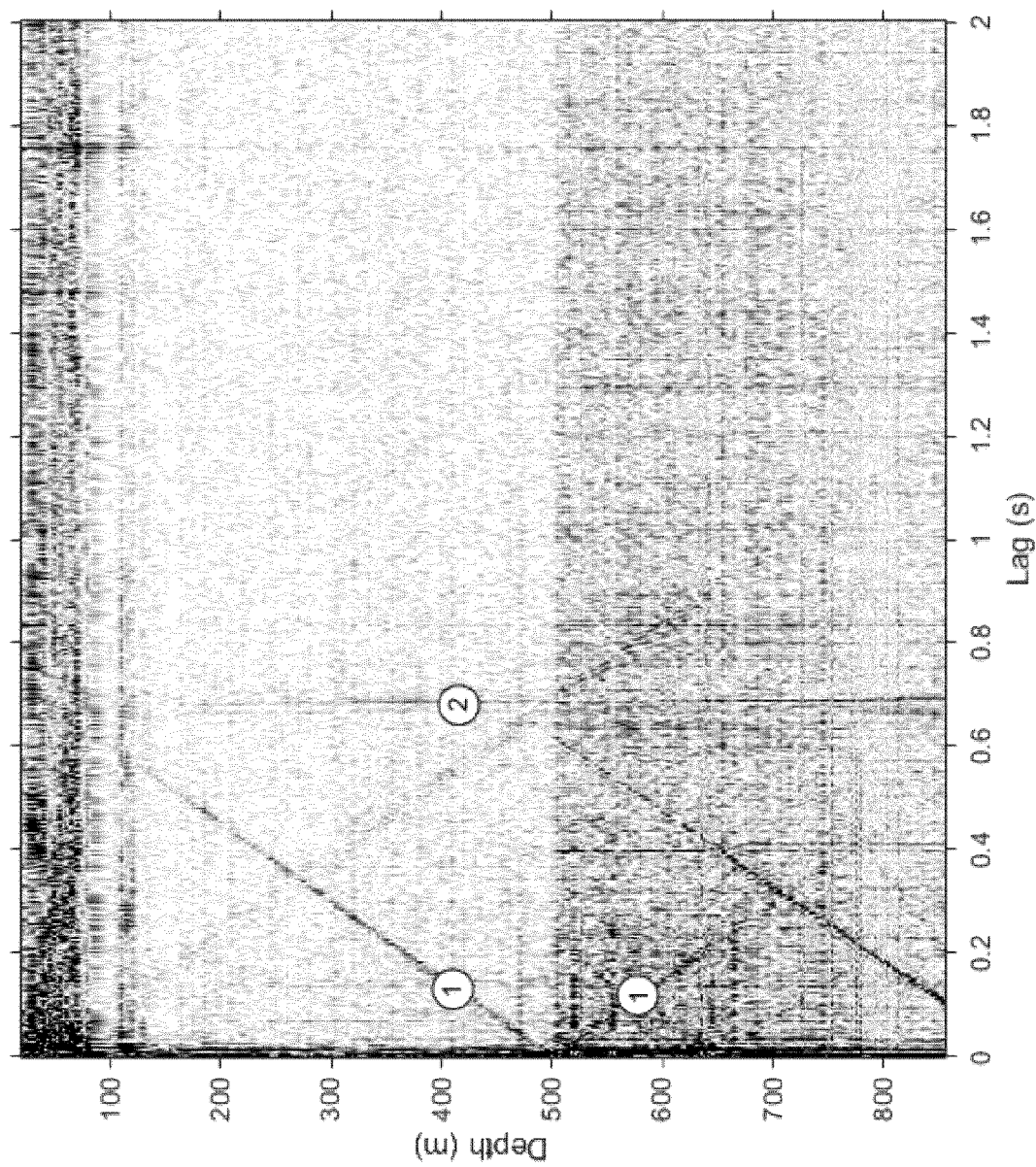
FIG. 14 is a plot of autocorrelation of field data collected using an acoustic logging tool.

Turning to FIG. 14, the data for this plot was collected using an acoustic sensor that was moved along a wellbore. The sensor was moved at 5 m increments and at each 30 s of acoustic data was collected. The lines 1, 2, 4 and 5 are all visible on the plot. Because we cannot read $v_2$ from the plot, we only have y. In this case y=496.5 m, which is also the estimate of the location of the reflective interface. From other logs performed on this well, it is known that there is a reflective interface around 500 m. Thus, the result matches what is known about the well.

Figure 15:
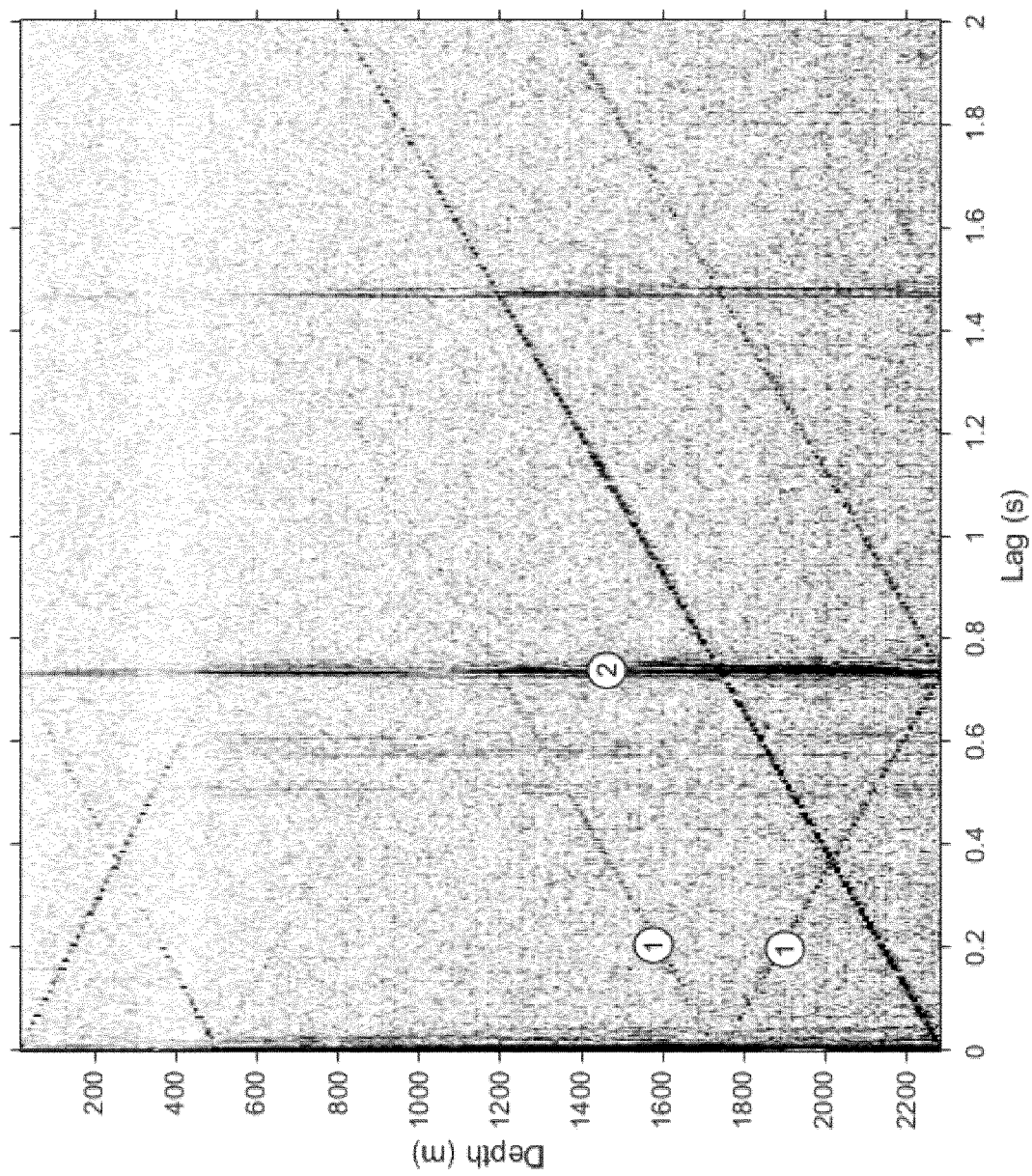
FIG. 15 is a plot of autocorrelation of field data collected using an acoustic logging tool.

Turning now to FIG. 15, the situation in this log is the same as for the previous example. In this case the y-intercept obtained from the plot is y=1744 m. Note that for this plot it is possible to see some of the additional diagonal lines that indicate that in this well there is in fact a reflective interface and not an acoustic source.

In some circumstances, as in the case of a wellbore, it is possible to artificially shorten the length of the conduit by placing a reflector above and below the acoustic sensor. With this setup, one advantage is that the attenuation over the length of the conduit is much less, and the reflections from the ends of the conduit are much stronger. Therefore, the sensitivity of the methods is be increased, and "quieter" acoustic sources are detectable. As the skilled person would recognize, the analysis of the autocorrelation plot will be largely the same, with slight modifications to account for the reflectors.

The embodiments have been described above with reference to flow and block and block diagrams of methods, apparatuses, systems, and computer program products. In this regard, the flow and block diagrams in FIGS. 1A, 2 and 3 illustrate the architecture, functionality, and operation of possible implementations of various embodiments. For instance, each block of the flow and block diagrams may represent a module, segment, or portion of code, which comprises one or more executable instructions for implementing the specified logical function(s). In some different embodiments, the functions noted in that block may occur out of the order noted in those figures. For example, two blocks shown in succession may, in some embodiments, be executed substantially concurrently, or the blocks may sometimes be executed in the reverse order, depending upon the functionality involved. Some specific examples of the foregoing have been noted above but those noted examples are not necessarily the only examples. Each block of the flow and block diagrams, and combinations of those blocks, may be implemented by special purpose hardware-based systems that perform the specified functions or acts, or combinations of special purpose hardware and computer instructions.

Each block of the flow and block diagrams and combinations thereof can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the blocks of the flow and block diagrams.

These computer program instructions may also be stored in a computer-readable medium that can direct a computer, other programmable data processing apparatus, or other devices to function in a particular manner, such that the instructions stored in the computer-readable medium produce an article of manufacture including instructions that implement the function or act specified in the blocks of the flow and block diagrams. The computer program instructions may also be loaded onto a computer, other programmable data processing apparatus, or other devices to cause a series of operational steps to be performed on the computer, other programmable apparatus or other devices to produce a computer-implemented process such that the instructions that execute on the computer or other programmable apparatus provide processes for implementing the functions or acts specified in the blocks of the flow and block diagrams.

As will be appreciated by one skilled in the art, embodiments of the technology described herein may be embodied as a system, method, or computer program product. Accordingly, these embodiments may take the form of an entirely hardware embodiment, an entirely software embodiment (including firmware, resident software, micro-code, etc.) or an embodiment combining software and hardware that may all generally be referred to herein as a "circuit", "module", or "system". Furthermore, embodiments of the presently described technology may take the form of a computer program product embodied in one or more non-transitory computer readable media having stored or encoded thereon computer readable program code.

Where aspects of the technology described herein are implemented as a computer program product, any combination of one or more computer readable media may be used. A computer-readable medium may comprise a computer-readable signal medium or a non-transitory computer-readable medium used for storage. A non-transitory computer-readable medium may comprise, for example, an electronic, magnetic, optical, electromagnetic, infrared, or semiconductor system, apparatus, or device, or any suitable combination thereof. Additional examples of non-transitory computer-readable media comprise a portable computer diskette, a hard disk, RAM, ROM, an erasable programmable read-only memory (EPROM or flash memory), a portable compact disc read-only memory (CD-ROM), an optical storage device, a magnetic storage device, or any suitable combination thereof. As used herein, a non-transitory computer-readable medium may comprise any tangible medium that can contain, store, or have encoded thereon a program for use by or in connection with an instruction execution system, apparatus, or device. Thus, computer-readable program code for implementing aspects of the embodiments described herein may be contained, stored, or encoded on the computer-readable medium 104 of the signal processing device 118.

Program code embodied on a computer-readable medium may be transmitted using any appropriate medium, including but not limited to wireless, wireline, optical fiber cable, radiofrequency, and the like, or any suitable combination thereof. Computer program code for carrying out operations comprising part of the embodiments described herein may be written in any combination of one or more programming languages, including an object-oriented programming language and procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider).

The terminology used herein is for the purpose of describing particular embodiments only, and is not intended to be limiting. Accordingly, as used herein, the singular forms "a", "an" and "the" are intended to include the plural forms as well, unless the context clearly indicates otherwise. It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

One or more example embodiments have been described by way of illustration only. This description is been presented for purposes of illustration and description, but is not intended to be exhaustive or limited to the form disclosed. It is furthermore contemplated that any part of any aspect or embodiment discussed in this specification can be implemented or combined with any part of any other aspect or embodiment discussed in this specification. Many modifications and variations will be apparent to those of ordinary skill in the art without departing from the scope of the claims. In construing the claims, it is to be understood that the use of a computer to implement the embodiments described herein is essential at least where the presence or use of computer equipment is positively recited in the claims.

The invention claimed is:

1. A system for locating an area of interest in a conduit, the system comprising:
   a conduit;
   one or more optical fiber sensors positioned alongside the conduit;
   an optical interrogator configured to:
      transmit one or more light pulses along the one or more optical fiber sensors;
      receive reflections of the one or more light pulses; and
      determine from the reflections one or more interference signals; and
   one or more processors communicative with the optical interrogator and with a computer- readable medium having stored thereon computer program code configured when executed by one or more processors to cause the one or more processors to perform a method comprising:
   processing the one or more interference signals to obtain multiple acoustic recordings as a function of position along the conduit;
   for each acoustic recording, determining its autocorrelation; and
   applying a relationship to the determined autocorrelations to estimate a location of the area of interest, wherein the relationship is between autocorrelations of acoustic signals measured in a modelled conduit and modelled areas of interest in the modelled conduit, wherein it is assumed that acoustic signals propagating along the modelled conduit reflect from at least one point in the modelled conduit, wherein determining the autocorrelations comprises determining $R_w(\tau, d_r) = E[w_m(t, d_r)w_m(t-\tau, d_r)]$, wherein R is the autocorrelation of the acoustic recording, τ is a time lag of the autocorrelation, dr is a position along the conduit at which the acoustic recording is obtained, E is an expected value operator, t is time, and w is the acoustic recording.

2. The system of claim 1, wherein the method further comprises determining the relationship.

3. The system of claim 2, wherein determining the relationship comprises modelling propagations and reflections of acoustic signals along the modelled conduit.

4. The system of claim 1, wherein the area of interest comprises an acoustic source.

5. The system of claim 4, wherein the acoustic source comprises a leak in the conduit.

6. The system of claim 1, wherein the area of interest comprises a reflective interface in the conduit.

7. The system of claim 6, wherein the reflective interface comprises a change in an interior surface of the conduit or a change in a fluid in the conduit.

8. The system of claim 1, wherein the conduit comprises a pipeline or a wellbore.

9. The system of claim 1, wherein the modelled conduit comprises modelled acoustic channels each corresponding to a portion of the modelled conduit, each modelled acoustic channel being modelled as a filter affecting propagation of acoustic signals along the acoustic channel.

10. The system of claim 9, wherein each filter comprises a transfer function of the form $G(q) = aq^{-t}$, wherein G is the transfer function, q is a delay operator of the form $q^{-1}s(t) = s(t-1)$, s is a dummy variable, a is a constant indicative of attenuation along the acoustic channel, and t is a constant indicative of an amount of time taken by an acoustic signal to travel along the acoustic channel.

11. The system of claim 1, wherein estimating the location of the area of interest comprises using the determined autocorrelations to determine a distance to the area of interest as a function of time lag of the autocorrelations.

12. The system of claim 11, wherein estimating the location of the area of interest comprises generating a plot of the distance to the area of interest as a function of the time lag of the autocorrelations.

13. The system of claim 12, wherein the area of interest comprises an acoustic source, and wherein estimating the location of the area of interest comprises determining $$d_s = \frac{yv_2}{v_1},$$

wherein $d_s$ is a distance to the location of the area of interest, y is a y-intercept corresponding to one or more lines of the plot, and v1 and v2 are time lags corresponding to one or more lines of the plot.

14. The system of claim 12, wherein the area of interest comprises an acoustic source, and wherein estimating the location of the area of interest comprises determining $$d_s = \frac{1}{2}(d_l - y) + \frac{d_l}{2}\frac{v_2}{v_1 + v_2},$$

wherein $d_s$ is a distance to the location of the area of interest, y is a y-intercept corresponding to one or more lines of the plot, $v_1$ and $v_2$ are time lags corresponding to one or more lines of the plot, and di is a length of the conduit.

15. The system of claim 12, wherein the area of interest comprises a reflective interface in the conduit, and wherein estimating the location of the area of interest comprises determining a y-intercept corresponding to one or more lines of the plot.

16. The system of claim 12, wherein the area of interest comprises a reflective interface in the conduit, and wherein estimating the location of the area of interest comprises determining $$d_i = \frac{1}{2}y + \frac{1}{2}\frac{v_1 d_l}{v_1 + v_2},$$

wherein $d_i$ is a distance to the location of the area of interest, y is a y-intercept corresponding to one or more lines of the plot, $v_1$ and $v_2$ are time lags corresponding to one or more lines of the plot, and $d_l$ is a length of the conduit.

17. The system of claim 1, wherein the multiple acoustic recordings are obtained in respect of different periods of time.

* * * * *